United States Patent
Khan et al.

(10) Patent No.: US 8,929,485 B2
(45) Date of Patent: Jan. 6, 2015

(54) SYSTEM AND METHOD FOR BROADCAST PRE-CODING IN A MIMO SYSTEM

(75) Inventors: Farooq Khan, Allen, TX (US);
Jiann-An Tsai, Plano, TX (US);
Cornelius Van Rensberg, Dallas, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1083 days.

(21) Appl. No.: 11/738,612

(22) Filed: Apr. 23, 2007

(65) Prior Publication Data
US 2007/0291871 A1    Dec. 20, 2007

Related U.S. Application Data

(60) Provisional application No. 60/814,439, filed on Jun. 16, 2006.

(51) Int. Cl.
*H04K 1/02* (2006.01)
*H04L 1/00* (2006.01)
*H04L 27/26* (2006.01)
*H04L 1/06* (2006.01)

(52) U.S. Cl.
CPC ........... *H04L 1/0056* (2013.01); *H04L 27/2647* (2013.01); *H04L 1/0618* (2013.01); *H04L 27/2626* (2013.01)
USPC ............................. 375/299; 375/260; 455/101

(58) Field of Classification Search
CPC .. H04B 7/0639; H04B 7/0408; H04B 7/0456; H04B 7/0452; H04B 7/0697; H04B 7/0617; H04L 25/03898; H04L 1/0612; H04L 27/2601
USPC .............. 375/260, 267, 261, 299; 455/562.1, 455/101; 370/478, 335, 342
See application file for complete search history.

(56) References Cited

U.S. PATENT DOCUMENTS

| | | | |
|---|---|---|---|
| 2004/0136349 A1* | 7/2004 | Walton et al. | 370/338 |
| 2005/0058089 A1* | 3/2005 | Vijayan et al. | 370/312 |
| 2005/0101259 A1* | 5/2005 | Tong et al. | 455/69 |
| 2006/0019709 A1* | 1/2006 | Kim et al. | 455/562.1 |
| 2006/0067206 A1* | 3/2006 | Mantravadi et al. | 370/208 |
| 2006/0098567 A1* | 5/2006 | Willenegger et al. | 370/206 |
| 2006/0209980 A1* | 9/2006 | Kim et al. | 375/267 |
| 2006/0250941 A1* | 11/2006 | Onggosanusi et al. | 370/208 |
| 2006/0256761 A1* | 11/2006 | Meylan et al. | 370/338 |
| 2007/0104151 A1* | 5/2007 | Papasakellariou et al. | 370/335 |
| 2007/0104283 A1* | 5/2007 | Han et al. | 375/260 |
| 2007/0191066 A1* | 8/2007 | Khojastepour et al. | 455/562.1 |
| 2007/0195907 A1* | 8/2007 | Wang et al. | 375/267 |

(Continued)

OTHER PUBLICATIONS

Vaibhav Singh; On Superposition Coding for Wireless Broadcast Channels; M.Sc. Thesis; 2005.*

(Continued)

*Primary Examiner* — Aristocratis Fotakis

(57) ABSTRACT

The present disclosure relates generally to a system and method for broadcast pre-coding in a multiple input multiple output (MIMO) system. In one example, the method includes modulating a broadcast signal to create a stream of modulated symbols. Pre-coding is performed on each of the modulated symbols to break each modulated symbol into at least two pre-coded portions, and the two pre-coded portions of each modulated symbol are transmitted via at least two antennas.

20 Claims, 14 Drawing Sheets

(56) References Cited

U.S. PATENT DOCUMENTS

| | | | |
|---|---|---|---|
| 2007/0250638 A1* | 10/2007 | Kiran et al. | 709/236 |
| 2007/0286238 A1* | 12/2007 | Wang et al. | 370/478 |
| 2007/0291867 A1* | 12/2007 | Khan et al. | 375/267 |
| 2008/0032744 A1* | 2/2008 | Khan et al. | 455/562.1 |
| 2008/0298482 A1* | 12/2008 | Rensburg et al. | 375/260 |
| 2009/0028258 A1* | 1/2009 | Ma et al. | 375/260 |
| 2009/0252247 A1* | 10/2009 | Lee et al. | 375/267 |

OTHER PUBLICATIONS

R1-050889 "MIMO for Long Term Evolution", 3GPP TSG RAN WG1 Meeting #42, London, UK, Aug. 29-Sep. 2, 2005.*

R1-060335, "Downlink MIMO for EUTRA", 3GPP TSG RAN WG1 Meeting #44, Samsung, Denver, USA, Feb. 13-17, 2006.*

R1-030586, "Per Unitary basis stream User and Rate Control (PU2RC)", Samsung and SNU, 3GPP TSG RAN WG 1 #32 TSGR1#32, Paris, France, May 19-23, 2003.*

R1-040329, TSG-RAN Working Group1 meeting #36, Samsung & SNU, Malaga, Spain, Feb. 16-20, 2004.*

3GPP TR 25.876 V1.8.0 (Oct. 2005), Release 7, 3rd Generation Partnership Project, Technical Specification Group Radio Access Network, Multiple-Input Multiple Output in UTRA.*

* cited by examiner

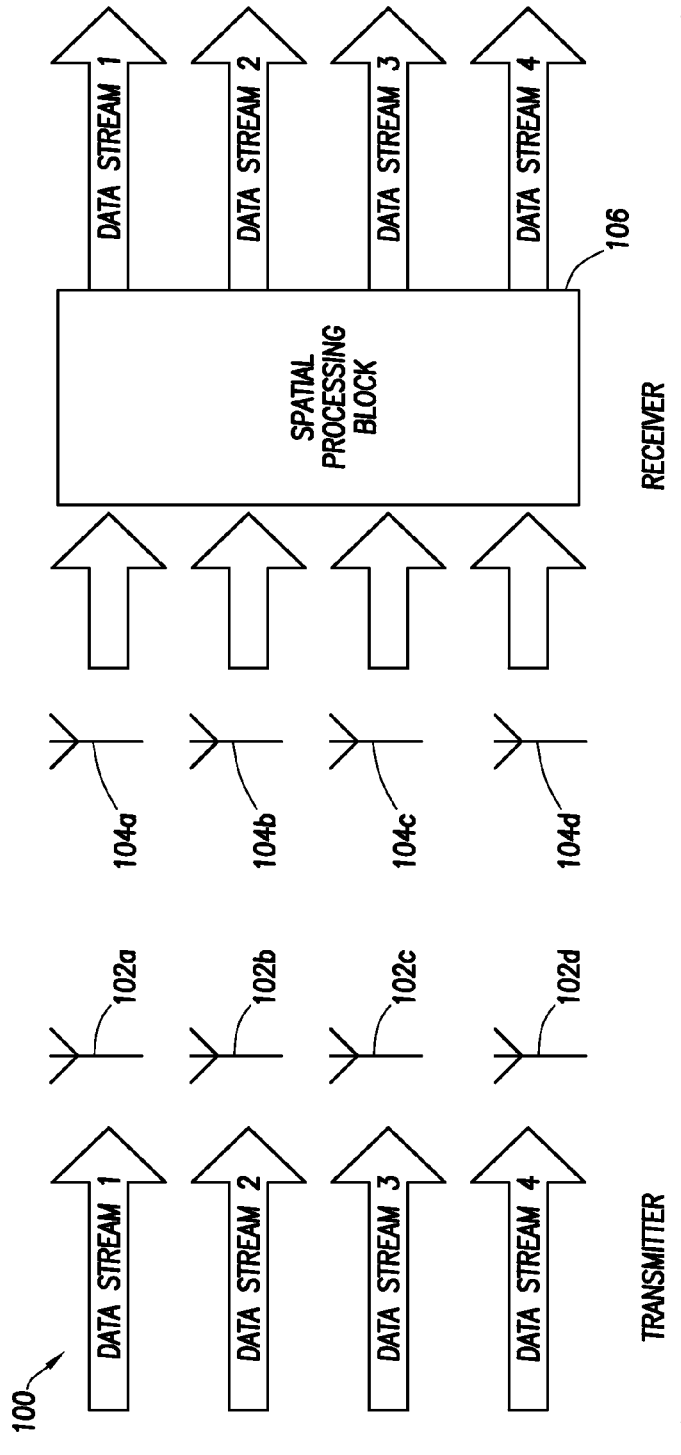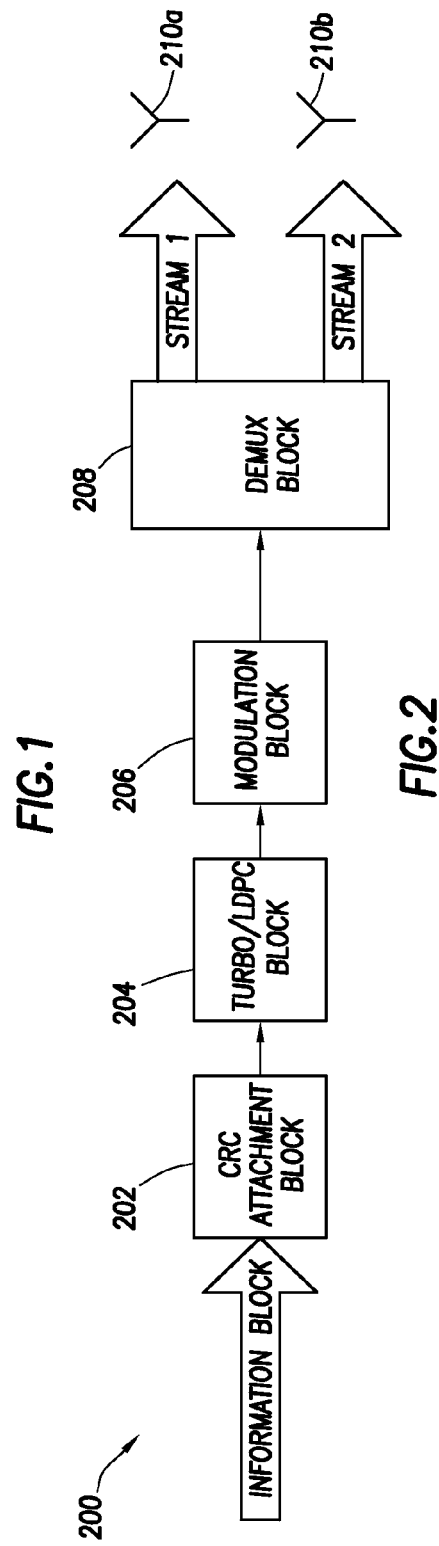

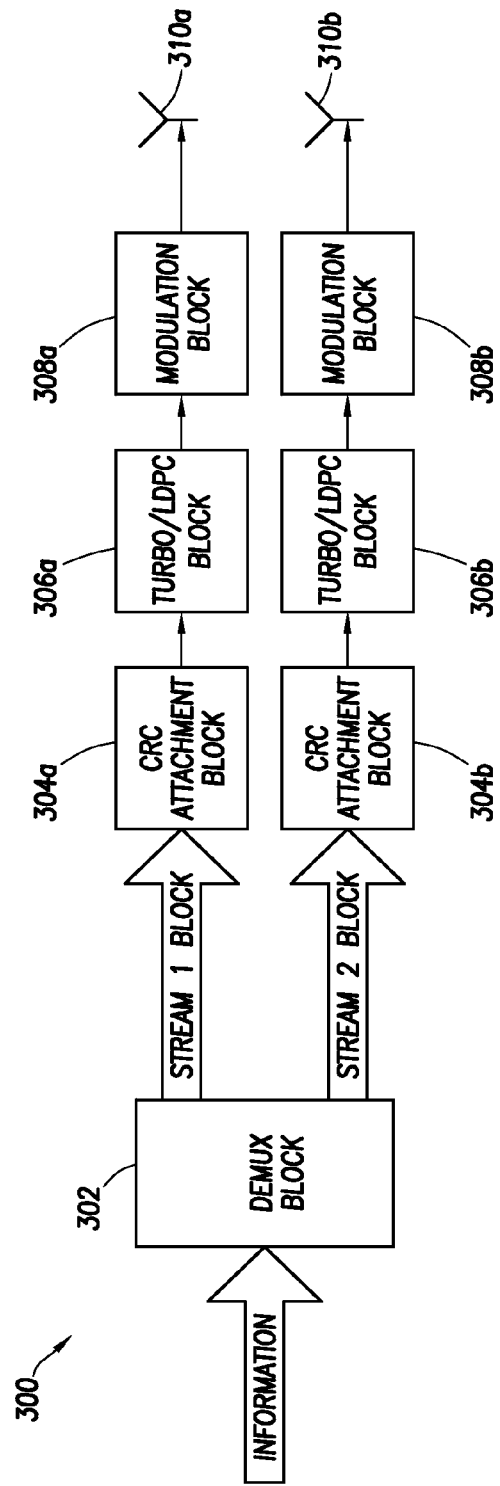
FIG.3
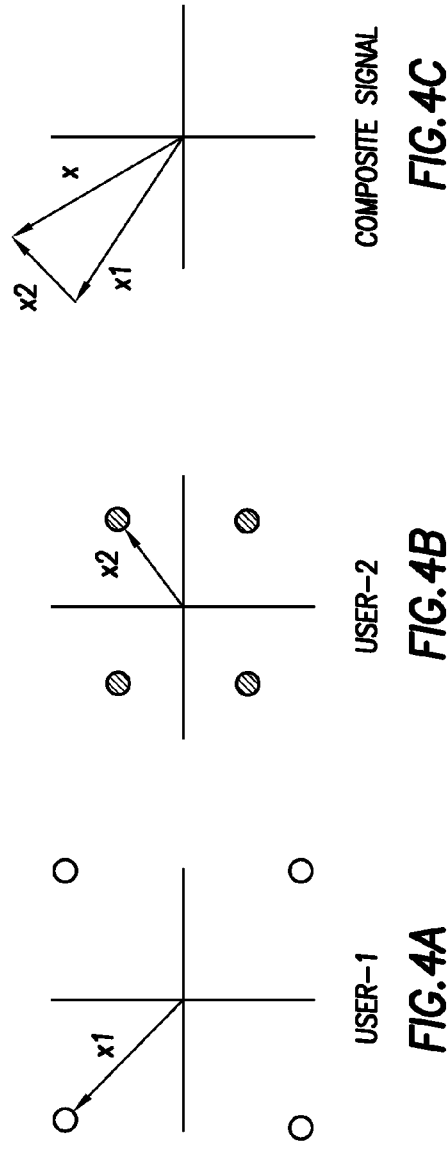
FIG.4A USER-1
FIG.4B USER-2
FIG.4C COMPOSITE SIGNAL

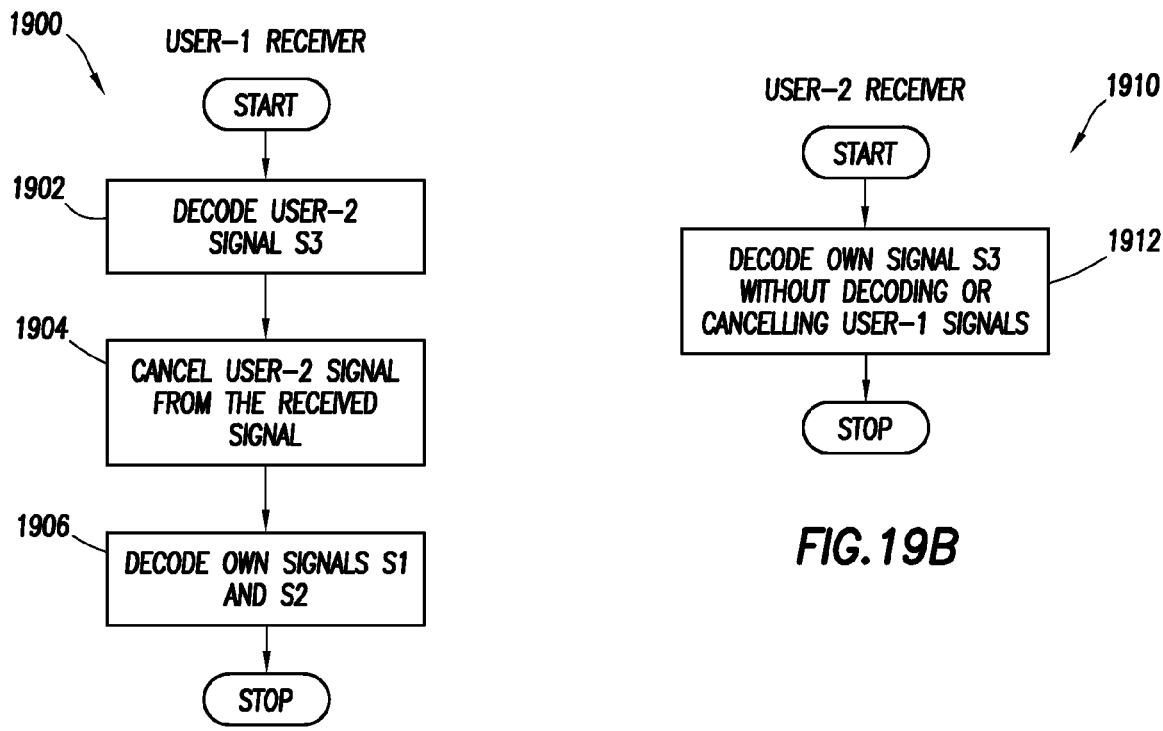
FIG.19A
FIG.19B
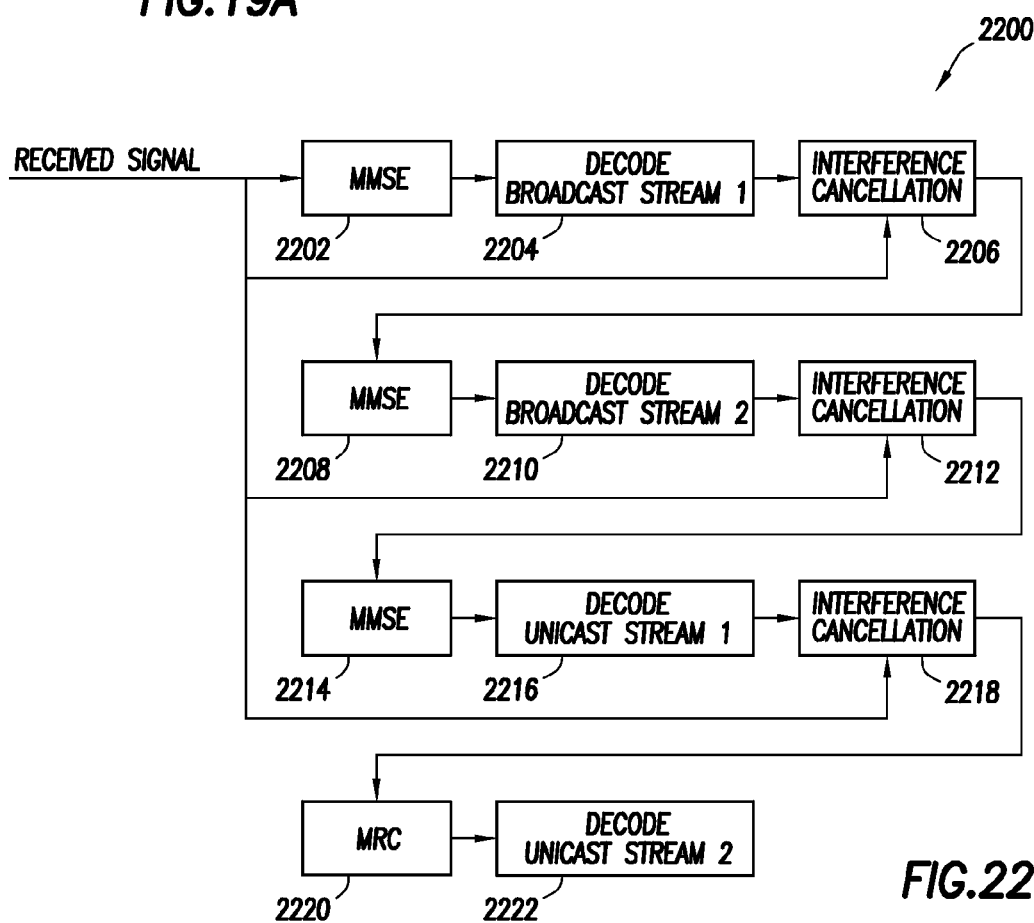
FIG.22

SYSTEM AND METHOD FOR BROADCAST PRE-CODING IN A MIMO SYSTEM

CLAIM OF PRIORITY AND CROSS-REFERENCE TO RELATED APPLICATIONS

This application claims priority from U.S. Provisional Patent Application Ser. No. 60/814,439, filed on Jun. 16, 2006, which is incorporated by reference herein in its entirety.

This application is related to U.S. patent application Ser. No. 11/554,686, filed on Oct. 31, 2006, and entitled "WIRELESS COMMUNICATION METHOD AND SYSTEM FOR COMMUNICATING VIA MULTIPLE INFORMATION STREAMS", U.S. patent application Ser. No. 11/554,726, filed on Oct. 31, 2006, and entitled "WIRELESS COMMUNICATION SYSTEM AND METHODOLOGY FOR COMMUNICATING VIA MULTIPLE INFORMATION STREAMS", and U.S. Patent Application Serial No., filed on Apr. 23, 2007, and entitled SYSTEM AND METHOD FOR SUPERPOSITION CODING AND INTERFERENCE CANCELLATION IN A MIMO SYSTEM", which are incorporated by reference herein in their entirety.

BACKGROUND

In a wireless system, different methods may be used to maximize the signal capacity that may be transmitted. However, current methods contain inefficiencies that negatively impact system capacity and performance, which results in inefficient use of the radio spectrum. Accordingly, it is desirable that such inefficiencies be addressed.

SUMMARY

In one embodiment, a method comprises modulating a broadcast signal to create a stream of modulated symbols, performing pre-coding on each of the modulated symbols to break each modulated symbol into at least first and second pre-coded portions, and transmitting the first and second pre-coded portions of each modulated symbol via at least first and second antennas, respectively, of a multiple input multiple output (MIMO) system.

In another embodiment, a method comprises demultiplexing a broadcast signal into at least first and second signal portions. The first signal portion is modulated to create a first stream of modulated symbols and the second signal portion is modulated to create a second stream of modulated symbols. Pre-coding is performed on the first stream of modulated symbols to distribute the first stream of modulated symbols between at least first and second antennas of a multiple input multiple output (MIMO) system. Pre-coding is performed on the second stream of modulated symbols to distribute the second stream of modulated symbols between at least the first and second antennas. The pre-coded first and second streams of modulated symbols are transmitted via at least the first and second antennas.

In yet another embodiment, a method comprises receiving a broadcast transmission containing first and second pre-coded portions of a modulated symbol via at least first and second antennas, respectively, of a multiple input multiple output (MIMO) system. An inverse of the first and second pre-coded portions is taken to recover the modulated symbol, and the modulated symbol is combined with other modulated symbols of the broadcast transmission to recover the broadcast transmission.

In still another embodiment, a system comprises a demultiplexing block, a modulation block, and a pre-coding block. The demultiplexing block is configured to demultiplex a broadcast signal into at least first and second signal portions. The modulation block is configured to modulate the first signal portion to create a first stream of modulated symbols and the second signal portion to create a second stream of modulated symbols. The pre-coding block is configured to pre-code the first stream of modulated symbols to distribute the first stream of modulated symbols between at least first and second antennas of a multiple input multiple output (MIMO) system, and to pre-code the second stream of modulated symbols to distribute the second stream of modulated symbols between at least the first and second antennas.

In another embodiment, a system comprises a modulation block, a pre-coding block, and a transmitter. The modulation block is configured to modulate a broadcast signal to create a stream of modulated symbols. The pre-coding block is configured to pre-code each of the modulated symbols to break each modulated symbol into at least first and second pre-coded portions. The transmitter is configured to transmit the first and second pre-coded portions of each modulated symbol via at least first and second antennas, respectively, of a multiple input multiple output (MIMO) system.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a diagram of one embodiment of a multiple input multiple output (MIMO) system.

FIG. 2 is a diagram of one embodiment of a MIMO system using a single code word scheme.

FIG. 3 is a diagram of one embodiment of a MIMO system using a multiple code word scheme.

FIGS. 4a-4c illustrate one embodiment of superposition coding.

FIGS. 19a and 19b are flowcharts illustrating embodiments of superpositioned signal MIMO decoding based on MIMO channel rank.

FIG. 22 illustrates one embodiment of a process by which superimposed multi-layer unicast and broadcast data may be decoded by a MIMO receiver.

DETAILED DESCRIPTION

Figure 5:
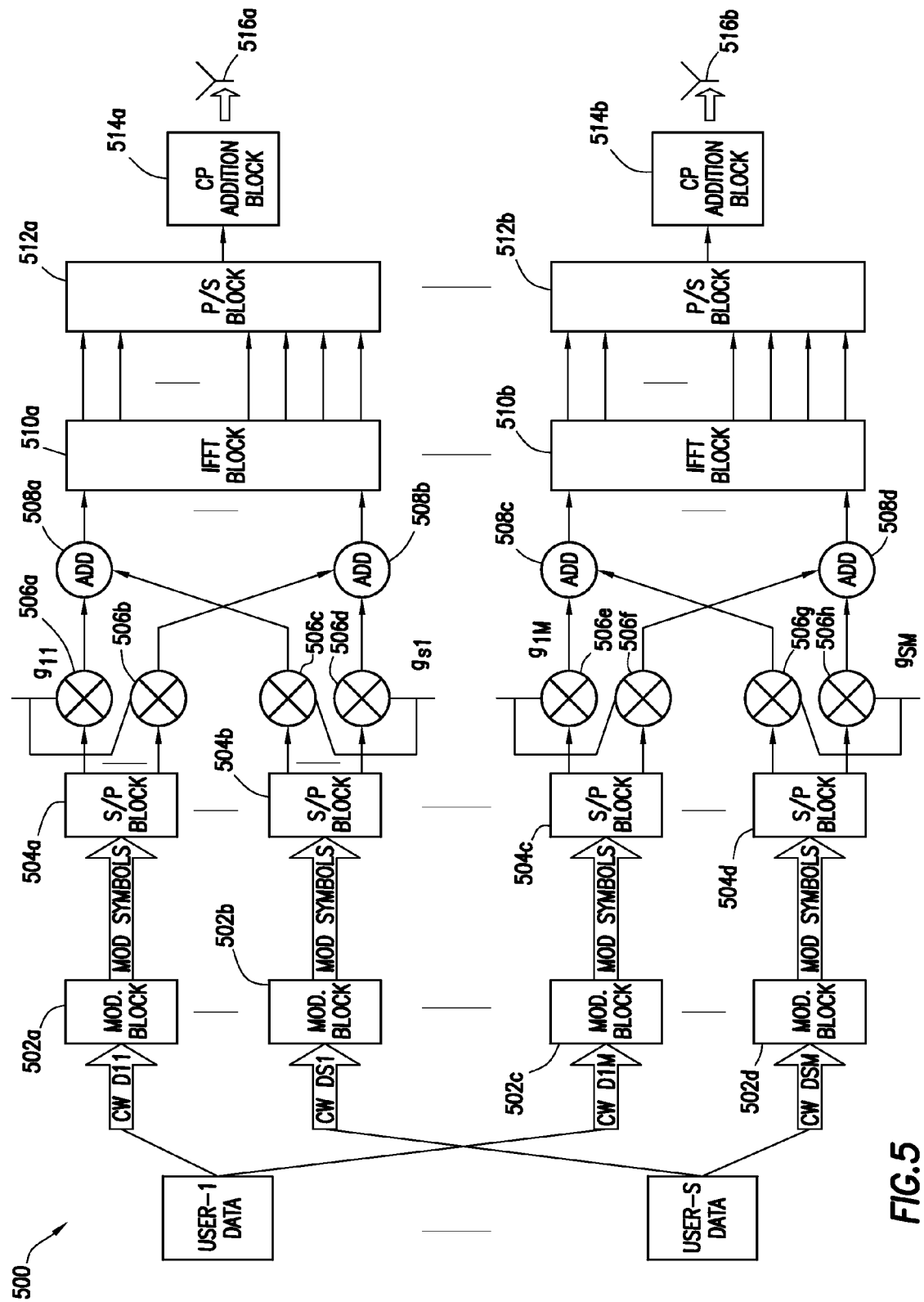
FIG. 5 illustrates one embodiment of a MIMO system using superposition coding.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a multiple input multiple output (MIMO) system 100 is illustrated. The MIMO system 100 is a 4×4 system that uses multiple transmit antennas 102a-102d and multiple receive antennas 104a-104d to improve the capacity and reliability of wireless communication channels. Such a MIMO system may provide a linear increase in capacity with K, where K is the minimum of number of transmit (M) and receive antennas (N) (i.e., K=min (M,N)). The simplified example provided by the 4×4 MIMO system 100 is able to separately transmit four different data streams (Data Streams 1-4) from the four transmit antennas 102a-102d. The transmitted signals are received at the four receive antennas 104a-104d. In the present example, spatial signal processing may be performed by spatial processing block 106 on the received signals in order to recover the four data streams. For example, the spatial signal processing may include the use of a scheme such as Vertical Bell Laboratories Layered Space-Time (V-BLAST), which uses the successive interference cancellation principle to recover the transmitted data streams. In other embodiments, MIMO schemes may be used that perform space-time coding across the transmit antennas (e.g., Diagonal Bell Laboratories Layered Space-Time (D-BLAST)) and/or beamforming schemes such as Spatial Division Multiple Access (SDMA).

MIMO channel estimation may include estimating the channel gain and phase information for links from each of the transmit antennas 102a-102d to each of the receive antennas 104a-104d. Accordingly, a channel for an M×N MIMO system may be described as an M×N matrix H:

$$H = \begin{bmatrix} a_{11} & a_{12} & \cdots & a_{1N} \\ a_{21} & a_{22} & \cdots & a_{2N} \\ \vdots & \vdots & \cdots & \vdots \\ a_{M1} & a_{M2} & \cdots & a_{MN} \end{bmatrix}$$

where $a_{ij}$ represents the channel gain from transmit antenna i to receive antenna j. In order to enable the estimations of the elements of the MIMO channel matrix, separate pilot signals may be transmitted from each of the transmit antennas. Other embodiments of MIMO systems are described in detail in previously incorporated U.S. patent application Ser. Nos. 11/554,686 and 11/554,726.

Referring to FIG. 2, one embodiment of a single-code word MIMO transmission system 200 is illustrated. In the present example, the system 200 includes a cyclic redundancy check (CRC) attachment block 202, a turbo/LDPC (low-density parity-check) 204, a modulation block 206, a de-multiplexing (demux) block 208, and two antennas 210a and 210b. It is understood that blocks (e.g., demux block 208) may be divided into multiple blocks. It is also understood that the described functionality of the system 200 may be implemented in hardware, software, or a combination thereof.

In the case of single-code word MIMO transmission, a single information block enters the system 200 and a CRC is added to the single information block by CRC attachment block 202. Coding and modulation (e.g., quadrature phase shift keying (QPSK) or quadrature amplitude modulation (such as 16-QAM)) are performed on the single information block by the turbo/LPDC block 204 and modulation block 206, respectively, and the coded and modulated symbols are then de-multiplexed by demux block 208 for transmission over antennas 210a and 210b.

Referring to FIG. 3, one embodiment of a multiple-code word MIMO transmission system 300 is illustrated. In the present example, the system 300 includes a demux block 302, CRC attachment blocks 304a and 304b, turbo/LDPC blocks 306a and 306b, modulation blocks 308a and 308b, and two antennas 310a and 310b. It is understood that different blocks having the same functionality (e.g., CRC attachment blocks 304a and 304b) may be implemented as different blocks or may be implemented as a single block. Furthermore, single blocks (e.g., demux block 302) may be divided into multiple blocks. It is also understood that the described functionality of the system 300 may be implemented in hardware, software, or a combination thereof.

In the case of multiple-code word MIMO transmission, a single information block enters the system 300 and is de-multiplexed into smaller information blocks by demux block 302. In the present example, the single information block is de-multiplexed into two smaller blocks (denoted Stream 1

Block and Stream 2 Block), but it is understood that the de-multiplexing process may result in more than two smaller blocks. Individual CRCs are attached to Stream 1 Block and Stream 2 Block by CRC attachment blocks 304a and 304b, respectively, and then coding and modulation may be performed on Stream 1 Block and Stream 2 Block by turbo/LDPC blocks 306a and 306b, respectively, and modulation blocks 308a and 308b, respectively. Stream 1 Block and Stream 2 Block may then be transmitted from separate MIMO antennas (or beams) 310a and 310b, respectively.

It should be noted that, in the case of multi-code word MIMO transmissions, different modulation and coding may be applied to each of the individual streams Stream 1 Block and Stream 2 Block, resulting in a per antenna rate control (PARC) scheme. Multi-code word transmission may allow for more efficient post-decoding interference cancellation because, for example, a CRC check can be performed on each of the code words before the code word is cancelled from the overall signal. Accordingly, only correctly received code words may be cancelled, thereby avoiding any interference propagation in the cancellation process.

Referring to FIGS. 4a-4c, an example of superposition coding is illustrated. FIG. 4a illustrates a first user (User-1) associated with a first signal (signal x1) and FIG. 4b illustrates a second user (User-2) associated with a second signal (signal x2). As shown in FIG. 4c, signal x2 may be superimposed on signal x1, resulting in a composite signal x that is transmitted. At the receiver, User-2 may first decode signal x1, cancel it from the composite received signal x, and then decode its own signal x2. User-1 may decode its own signal x1 from the composite received signal x without any cancellation.

Referring to FIG. 5, in one embodiment, an M×M MIMO system 500 is illustrated. The present embodiment is used to illustrate a transmission scheme where superposition coding is performed in conjunction with each MIMO stream transmission. User signals may be selected for positioning within a particular layer of a superimposed signal based on many different criteria, examples of which are described in later embodiments. Although the present example is in the context of multi-code word transmission, it is understood that the principles described herein may be applied to single code word MIMO schemes. Furthermore, although the present example illustrates superposition coding as occurring after MIMO demultiplexing, it is understood that superposition coding may occur first in some embodiments. Generally, the present embodiment of an M×M MIMO system may enable up to SM code words (CW) to be transmitted simultaneously with M code words to each of S users.

In the present example, the system 500 includes modulation blocks 502a-502d (which may use any appropriate modulation type, such as QAM), serial-to-parallel (S/P) conversion blocks 504a-504d, gain means 506a-506d, addition blocks 508a-508d, Inverse Fast Fourier Transform blocks (510a and 510b), parallel-to-serial (P/S) conversion blocks 512a and 512b, and cyclic prefix (CP) addition blocks 514a and 514b. Although not shown, components similar to those of FIG. 3 may be positioned prior to modulation blocks 502a-502d. For example, prior to each modulation block 502a-502d, a demux block, CRC attachment block, and turbo/LDPC block, as well as other blocks, may be provided as described with respect to FIG. 3. It is understood that different blocks having the same functionality (e.g., S/P conversion blocks 504a-504d) may be implemented as different blocks or may be the same block, and that blocks may be further subdivided. Furthermore, it is understood that the functionally provided by various components of the system 500 may be implemented in software, hardware, or a combination thereof.

In the multiple-code word MIMO transmission of the present example, a user's information (e.g., User-1 Data) may undergo processing such as that described with respect to FIG. 3 (e.g., de-multiplexing, CRC attachment, and coding). This processing results in User-1 Data being divided into multiple data blocks, each of which is associated with an individual code word. In the present example, User-1 Data is split into M code words, denoted as CW D11-CW D1M in FIG. 5. Similarly, the data of each of the other users through the $S^{th}$ user (User-S Data) is split into M code words, with User-S Data being denoted as CW DS1-CW DSM in FIG. 5.

For purposes of illustration, the progression of code words CW D11 and CW DS1 through the system 500 will now be described. CW D11 enters modulation block 502a and is converted to a stream of modulated symbols. The modulated symbols are fed into S/P block 504a, where they undergo a serial to parallel conversion. A power gain of $g_{ij}$ may be applied to the $ij^{th}$ code word, so with respect to CW D11, a gain of $g_{11}$ may be applied by gain means 506a to each of the parallel modulated symbols forming CW D11. In a similar manner, CW DS1 enters modulation block 502b and is converted to a stream of modulated symbols. The modulated symbols are fed into S/P block 504b, where they undergo a serial to parallel conversion. A gain of $g_{S1}$ may be applied to each of the parallel modulated symbols by gain means 506b.

The first modulated symbol of CW D11 and the first modulated symbol of CW DS1 may then be superimposed in addition block 508a. Each of the remaining modulated symbols may be superimposed in a similar manner, with the last modulated symbol of CW D11 and the last modulated symbol of CW DS1 being superimposed in addition block 508b. The superimposed symbols may then enter IFFT block 510a in parallel, undergo IFFT processing, and then enter P/S block 512a for parallel to serial conversion. A CP may then be added to the serial stream by CP addition block 514a prior to transmission via antenna 516a.

Although not described in detail herein, other code words may undergo similar superpositioning, processing, and transmission until the $M^{th}$ code words (CW D1M and CW DSM) are superimposed, processed, and transmitted via antenna 516b. New data blocks for User-1 through User-S may then be processed.

Figures 6, 7:
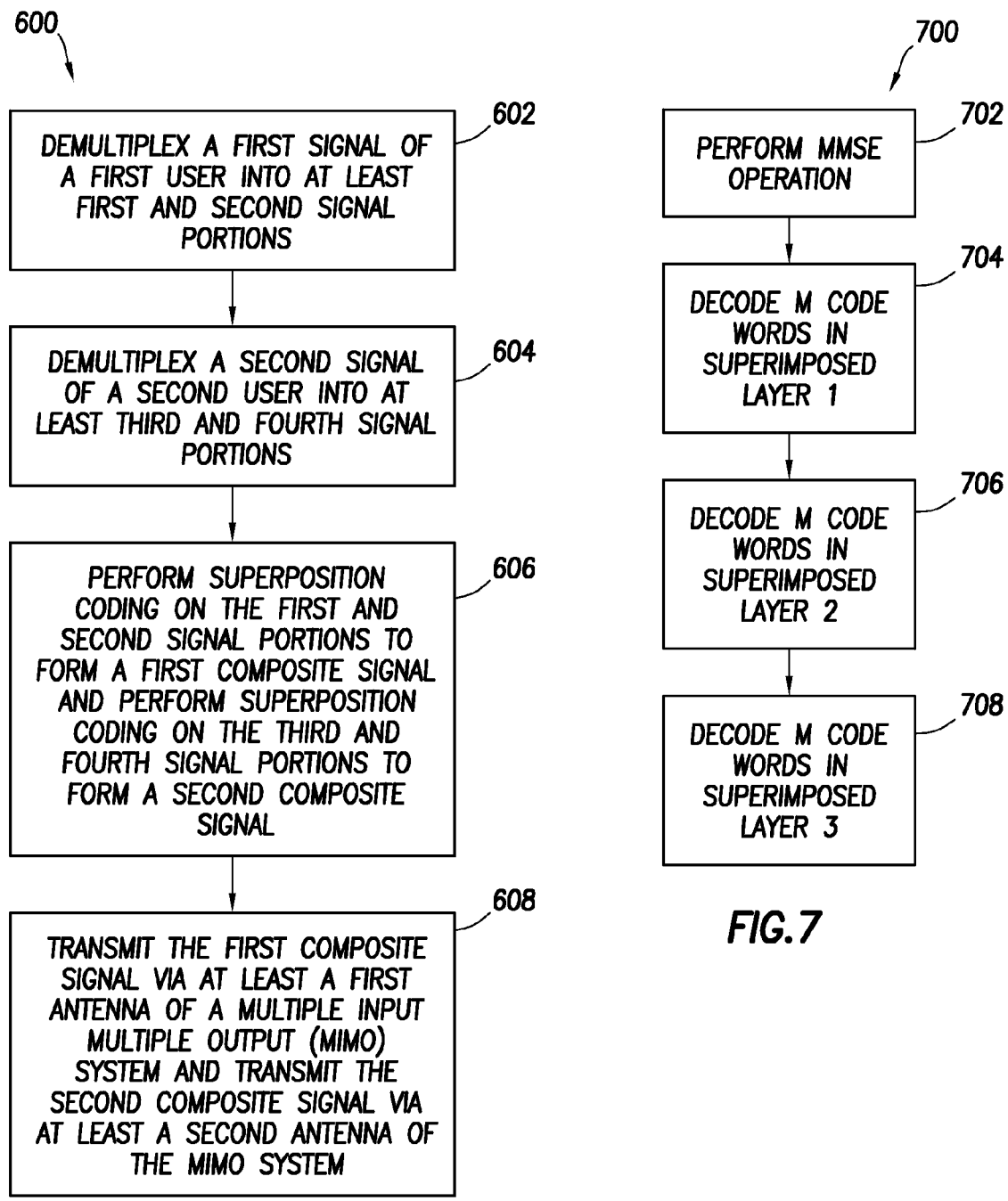
FIG. 6 is a flowchart illustrating one embodiment of a method for forming a superimposed multi-layer message for transmission in a MIMO system.
FIG. 7 is a flowchart illustrating one embodiment of a method for decoding a superimposed multi-layer message by a MIMO receiver.

Referring to FIG. 6, in another embodiment, a method 600 illustrates a process by which superpositioning may occur within a MIMO system, such as the MIMO system 500 of FIG. 5. In step 602, a first signal of a first user (e.g., User-1 Data of FIG. 5) may be demultiplexed into at least first and second signal portions (e.g., CW D11 and CW D1M). In step 604, a second signal of a second user (e.g., User-S Data of FIG. 5) may be demultiplexed into at least third and fourth signal portions (e.g., CW DS1 and CW DSM). In step 606, superposition coding may be performed on the first and third signal portions to form a first composite signal and on the second and fourth signal portions to form a second composite signal. In step 608, the first composite signal may be transmitted via at least a first antenna (e.g., antenna 516a) and the second composite signal may be transmitted via at least a second antenna (e.g., antenna 516a). It is understood that the term "signal" as used in the present example may include code words, modulated symbols, or any other representation of data that may be processed by a MIMO system, whether in digital or analog form.

Referring to FIG. 7, a method 700 illustrates one embodiment of a decoding process that a receiver (not shown) may use to decode superimposed layers, such as those encoded by the system 500 of FIG. 5. In step 702, a minimum mean square error (MMSE) operation may be performed. In each of the following steps, M code words in a single superimposed layer may be decoded. For example, M code words may be decoded in superimposed layer 1 in step 704, M code words may be decoded in superimposed layer 2 in step 706, and M code words may be decoded in superimposed layer S in step 708. It is understood that, if the receiver's information is in a higher layer (e.g., layer 2), then lower layers (e.g., layer 3) may not be decoded.

Figure 8:
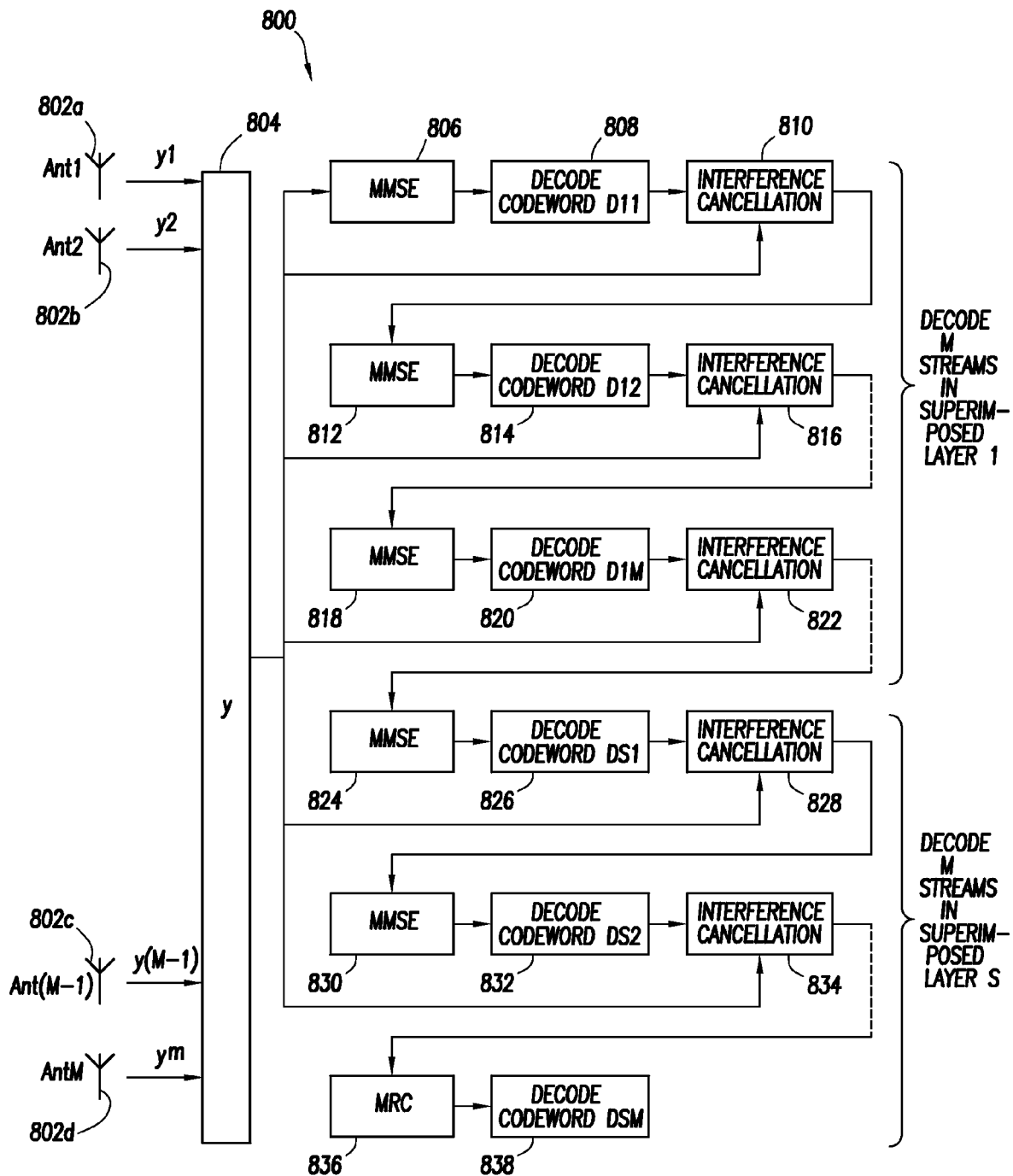
FIG. 8 illustrates one embodiment of a process by which superimposed multi-layer data may be decoded by a MIMO receiver.

Referring to FIG. 8, a more detailed embodiment of the method 700 of FIG. 7 is illustrated. The present embodiment illustrates a decoding process 800 that a receiver in a multi-stream MIMO system may use to decode superimposed layers, such as those encoded by the system 500 of FIG. 5. In this example, each of the superimposed layers includes a multi-stream MIMO transmission of order M (e.g., M code words). Generally, a superimposed layer k consists of code words Sk1, Sk2 . . . SkM. As described with respect to FIG. 5, each superimposed layer may be intended for a different user. Therefore, each user receives M code words (assuming multi-code word MIMO transmission). A user corresponding to the $k^{th}$ superimposed layer would need to decode k−1 superimposed layers (i.e., (k−1)M code words) before decoding its own layer (i.e., the $k^{th}$ layer). The layer decoding example of the present figure applies to a user associated with the last layer (i.e., the user needs to decode all the superimposed layers before reaching its own layer). However, it is understood that a user may stop layer decoding after decoding its own layer. For example, a user corresponding to the $k^{th}$ superimposed layer may stop processing after decoding the $k^{th}$ superimposed layer, even if other layers remain encoded.

For purposes of illustration, FIG. 8 continues the example of FIG. 5 with the use of code words CW D11-CW D1M and CW DS1-CW DSM. In the receiver, M code words are received at block 804 for S users as data y1-yM from antennas 802a-802d (e.g., ant1-antM). Although not shown, it is understood that block 804 may perform spatial signal processing and other operations to reform the signals received via antennas 802a-802d. As such operations are commonly known, they are not described in detail herein.

Beginning with code word D11, an MMSE operation is performed in block 806 and the code word is decoded in block 808. The decoded code word D11 is then cancelled from the composite signal in block 810, and the resulting signal is fed into block 812. In block 812, an MMSE operation is performed and the next code word D12 is decoded in block 814. The decoded code words D11 and D12 are then cancelled from the composite signal in 816, and the resulting signal is fed into the next block. This process may continue until the last code word in superimposed layer 1 is reached, which is code word D1M. Accordingly, an MMSE operation is performed in block 818 and code word D1M is decoded in block 820. If there is another superimposed layer, the decoded code words D11-D1M are then cancelled from the composite signal in block 822, and the resulting signal undergoes the next level of processing. It is understood that processing may end at this point if the receiver corresponds to the information in superimposed layer 1.

In the present example, the receiver corresponds to the last superimposed layer S and processing continues after layer 1. Although not shown, it is understood that many layers may be decoded between layer 1 and layer S. In block 824, an MMSE operation is performed and the code word DS1 is decoded in block 826. The decoded code words D11-DS1 are then cancelled from the composite signal in block 828, and the resulting signal is fed into block 830. In block 830, an MMSE operation is performed and the next code word DS2 is decoded in block 832. The decoded code words D11-DS2 are then cancelled from the composite signal in block 834, and the resulting signal is fed into the next block. This process may continue until the last code word in superimposed layer S is reached, which is code word DSM. As code word DSM is the last code word in the last layer, a maximum ratio combining (MRC) operation may be performed in block 836 and the last code word DSM is decoded in block 838.

Figure 9:
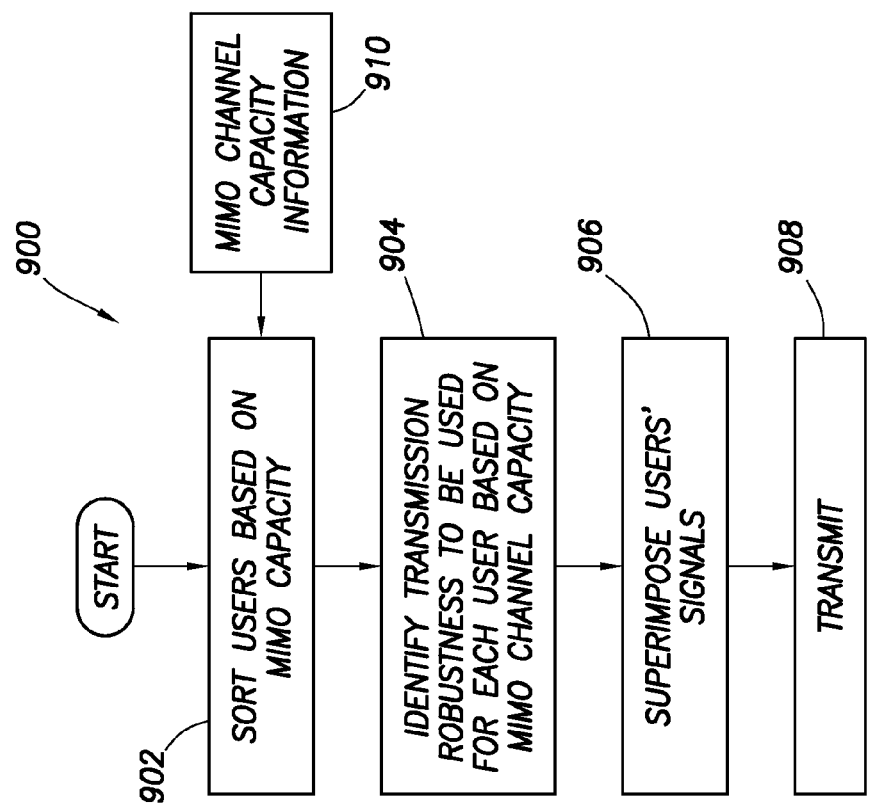
FIG. 9 is a flowchart illustrating one embodiment of a method for sorting users based on channel capacity information.

Referring to FIG. 9, in another embodiment, a method 900 illustrates the superposition coding of user signals based on the users' MIMO channel capacities. In step 902, users may be sorted by a system (e.g., the system 500 of FIG. 5) for superposition coding based on MIMO channel capacity using MIMO channel capacity information 910. Generally, the capacity of an M×M MIMO channel may be denoted by:

$$C_{MIMO} = E\left[\log_2 \det\left(I_M + \frac{SNR}{M} HH^*\right)\right]$$
$$[b/s/\text{Hz}]$$

where SNR is the received signal-to-noise ratio at each receive antenna.

It is noted that, in some embodiments, users may account for their receiver types when calculating the MIMO channel capacity. For example, a user with two receive antennas may have a different MIMO capacity compared to a user with four receive antennas. The MIMO capacity calculation may also take into account the effect of such factors as path loss, shadow fading, and fast fading.

In step 904, the system 500 may identify a level of transmission robustness for each user based on the user's MIMO channel capacity. For example, a more robust transmission may be used for lower MIMO channel capacity users so that these users can decode their signals without needing to cancel out the signals of stronger users with higher MIMO channel capacity. The stronger users with higher MIMO channel capacity may decode the signals transmitted to weaker users with lower MIMO channel capacity before decoding their own signals. In step 906, superposition of the user signals as previously described may occur using the robustness for each layer identified in step 904. The signals may then be transmitted in step 908.

Figure 10:
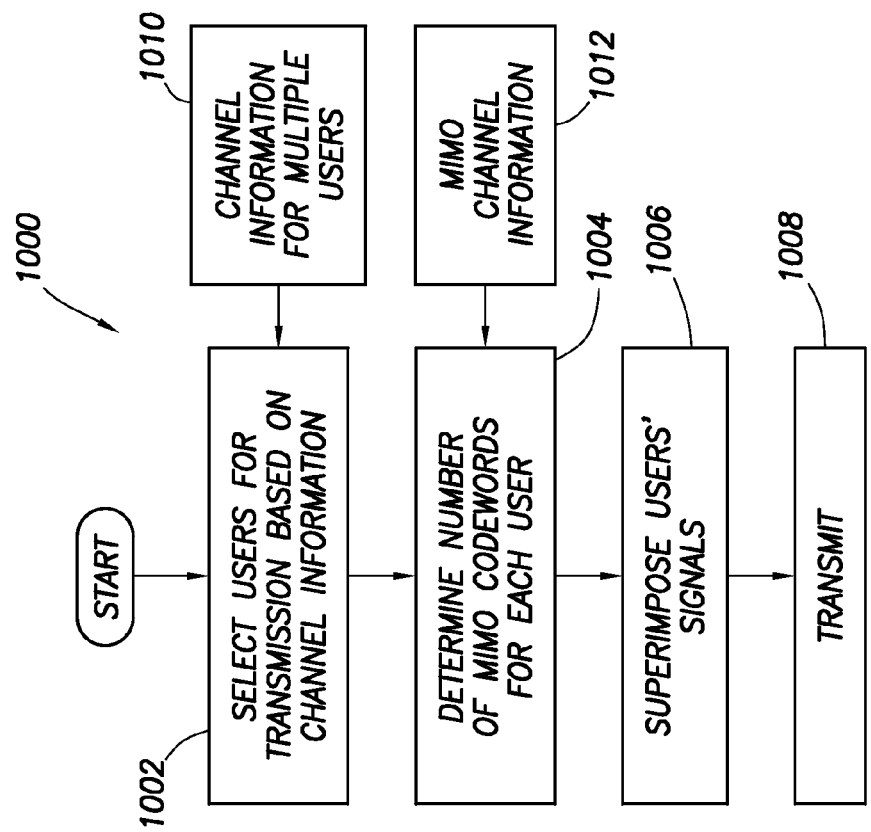
FIG. 10 is a flowchart illustrating one embodiment of a method for selecting users and associated code words.

Referring to FIG. 10, in another embodiment, a method 1000 illustrates the selection of users and corresponding code words based on the users' MIMO channel capacities in a system such as the system 500 of FIG. 5. In step 1002, users are selected for transmission based on information 1010 that represents channel information for multiple users. In step 1004, a number of MIMO code words are determined for each user based on MIMO channel information 1012 (e.g., channel rank). In step 1006, superposition of the user signals may occur as previously described prior to signal transmission in step 1008.

Figure 11:
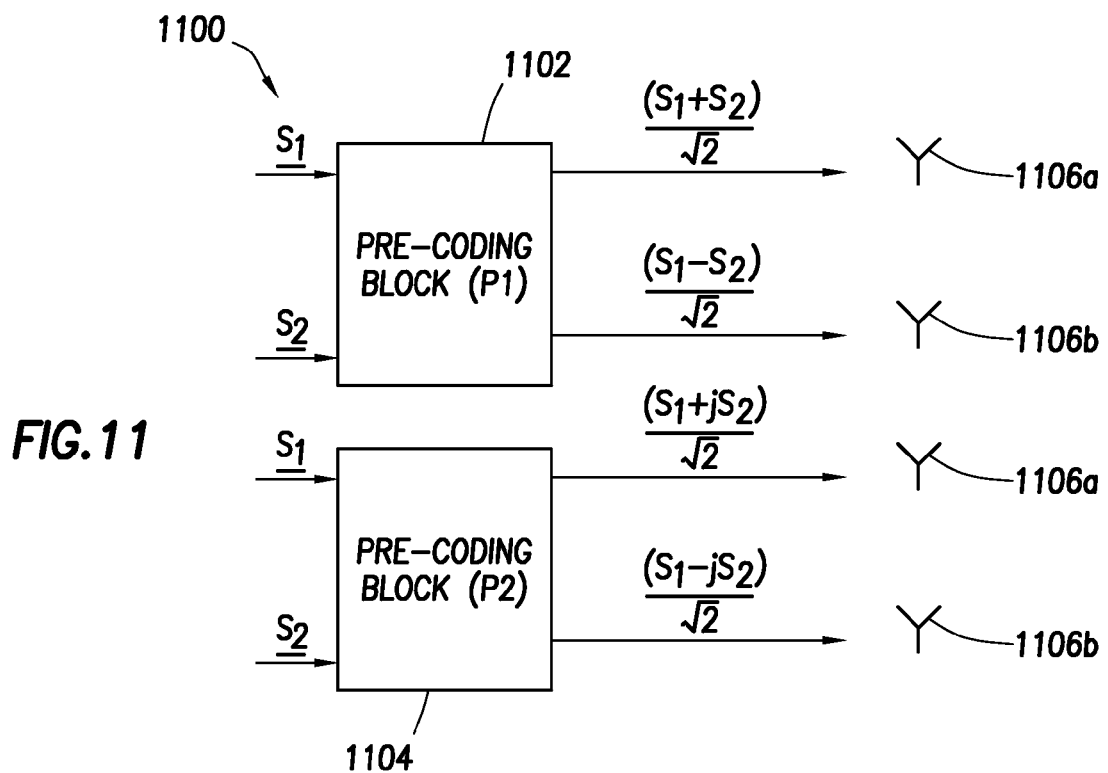
FIG. 11 is a diagram of one embodiment of a MIMO transmitter system using pre-coding.

Referring to FIG. 11, in yet another embodiment, a transmission system 1100 illustrates that superimposed code words transmitted over multiple transmit antennas may be unitarily pre-coded before mapping to antennas 1106a and 1106b. Such pre-coding may spread the transmission of each code word across both antennas, rather than sending the entire code word over a single antenna. In this case, each code word may be potentially transmitted from two or more of the physical transmit antennas used for superimposed information transmission. For purposes of illustration, examples of unitary pre-coding matrices (denoted $P_1$ and $P_2$) for the case of two transmit antennas may be described as:

$$P_1 = \frac{1}{\sqrt{2}}\begin{bmatrix} 1 & 1 \\ 1 & -1 \end{bmatrix},$$

$$P_2 = \frac{1}{\sqrt{2}}\begin{bmatrix} 1 & 1 \\ j & -j \end{bmatrix}$$

Assuming modulation symbols S1 and S2 are transmitted at a given time from Stream 1 and Stream 2 respectively, the modulation symbols after pre-coding with matrix $P_1$ and $P_2$ can be written as:

$$T_1 = P_1 \begin{bmatrix} S_1 \\ S_2 \end{bmatrix} = \frac{1}{\sqrt{2}}\begin{bmatrix} 1 & 1 \\ 1 & -1 \end{bmatrix} \times \begin{bmatrix} S_1 \\ S_2 \end{bmatrix} = \frac{1}{\sqrt{2}}\begin{bmatrix} S_1 + S_2 \\ S_1 - S_2 \end{bmatrix}$$

$$T_2 = P_2 \begin{bmatrix} S_1 \\ S_2 \end{bmatrix} = \frac{1}{\sqrt{2}}\begin{bmatrix} 1 & 1 \\ j & -j \end{bmatrix} \times \begin{bmatrix} S_1 \\ S_2 \end{bmatrix} = \frac{1}{\sqrt{2}}\begin{bmatrix} S_1 + S_2 \\ jS_1 - jS_2 \end{bmatrix}$$

Accordingly, the symbols $$T_{11} = \frac{(S_1 + S_2)}{\sqrt{2}}$$

and $$T_{12} = \frac{(S_1 - S_2)}{\sqrt{2}}$$

may respectively be transmitted from antennas 1106a and 1106b when pre-coding is done using pre-coding matrix $P_1$. Similarly, the symbols $$T_{21} = \frac{(S_1 + S_2)}{\sqrt{2}} \text{ and } T_{22} = \frac{(jS_1 - jS_2)}{\sqrt{2}}$$

may respectively be transmitted from antennas 1106a and 1106b when pre-coding is done using pre-coding matrix $P_2$.

Figure 12:
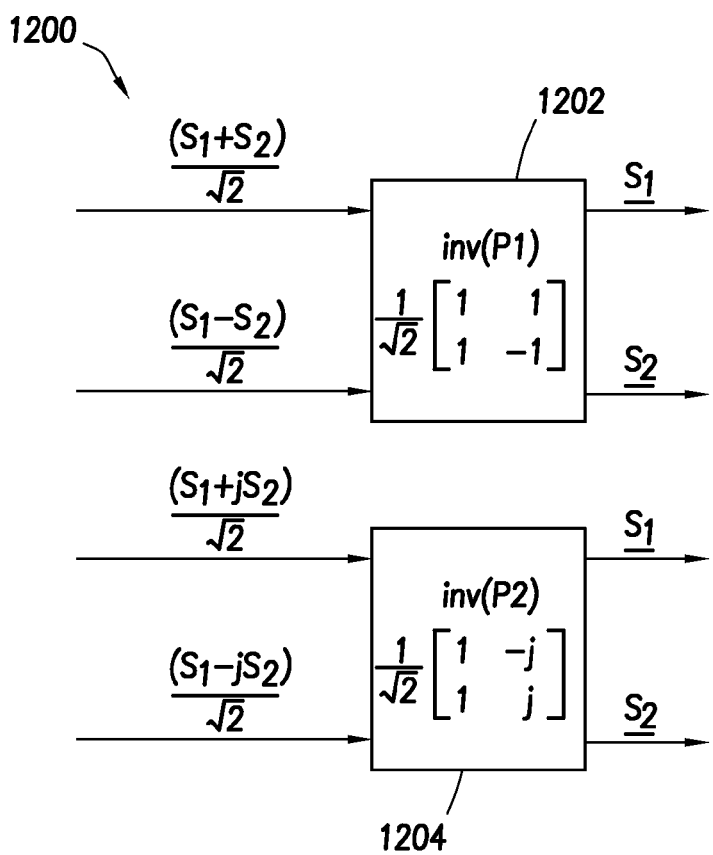
FIG. 12 is a diagram of one embodiment of a MIMO receiver system using pre-coding.

With additional reference to FIG. 12, inverse operations may be performed at a receiver system 1200 using inverse matrix blocks 1202 and 1204 (e.g., inv($P_1$) and inv($P_2$)) to recover the transmitted symbols in a pre-coded MIMO system. The received symbols are multiplied with the inverse pre-coding matrices as shown below:

$$inv(P_1)\frac{1}{\sqrt{2}}\begin{bmatrix} 1 & 1 \\ 1 & -1 \end{bmatrix}, \quad inv(P_2)\frac{1}{\sqrt{2}}\begin{bmatrix} 1 & -j \\ 1 & j \end{bmatrix}$$

It should be noted that the inverse of a unitary pre-coding matrix may be obtained by taking the complex conjugate transpose of the pre-coding matrix. The transmitted symbols are decoded by multiplying the received symbol vector with the inverse pre-coding matrices as shown below and in FIG. 12.

$$\frac{1}{\sqrt{2}}\begin{bmatrix} 1 & 1 \\ 1 & -1 \end{bmatrix} \times \frac{1}{\sqrt{2}}\begin{bmatrix} S_1 + S_2 \\ S_1 - S_2 \end{bmatrix} = \begin{bmatrix} S_1 \\ S_2 \end{bmatrix}$$

-continued $$\frac{1}{\sqrt{2}}\begin{bmatrix} 1 & -j \\ 1 & j \end{bmatrix} \times \frac{1}{\sqrt{2}}\begin{bmatrix} S_1 + S_2 \\ jS_1 - jS_2 \end{bmatrix} = \begin{bmatrix} S_1 \\ S_2 \end{bmatrix}$$

Figure 13:
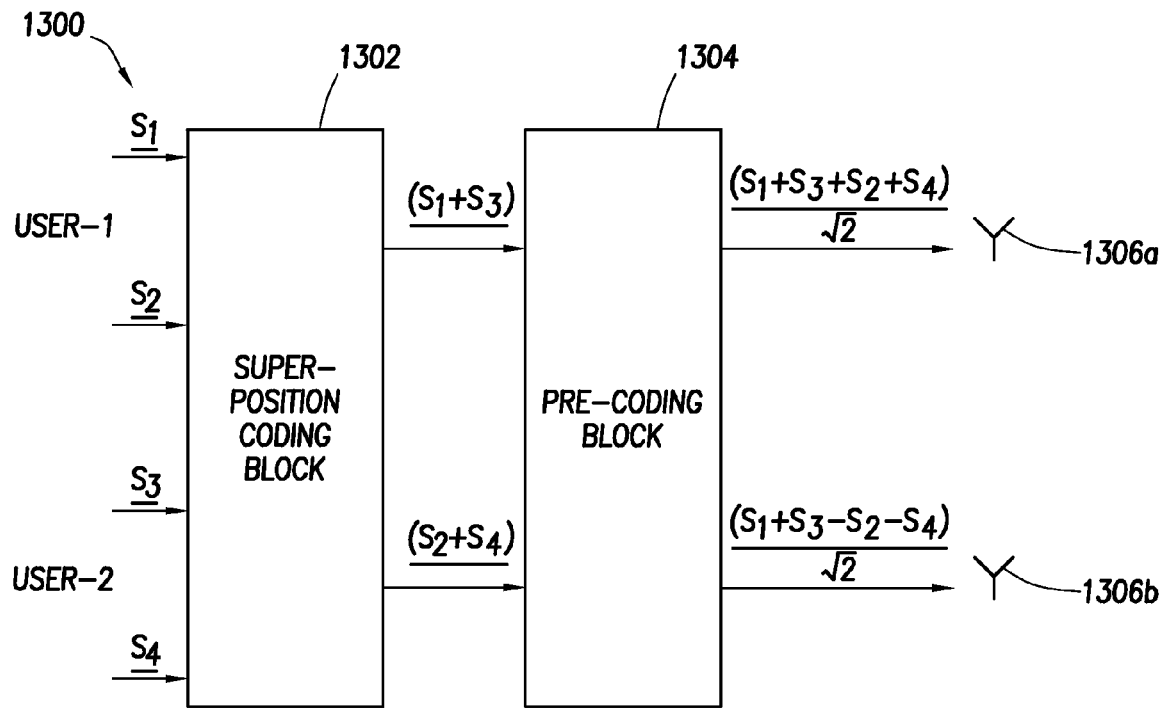
FIG. 13 is a diagram of one embodiment of a MIMO transmitter system using pre-coding after superposition coding with multiple streams per user.

Referring to FIG. 13, one embodiment of superposition coding in a pre-coded MIMO system is illustrated using a system 1300 that has a superposition coding block 1302 and a pre-coding block 1304. The superposition coding performed by superposition coding block 1202 is a simple addition of the users' signals, while MIMO pre-coding is performed in pre-coder block 1204. In this example, each user transmits two code words in a 2×2 MIMO system (i.e., a total of four code words are transmitted). For simplicity, there is only one complex modulation symbol per code word and power gains for different users' signals have been omitted. However, it is understood that additional modulation symbols may be used and, as described previously, different power gains may be applied to different users' signals.

Continuing the present example, modulation symbols S1, S2, S3 and S4 belong to first, second, third, and fourth code words, respectively. The first and second code words are transmitted to User-1, while the third and fourth code words are transmitted to User-2. Superposition coding block 1302 creates a composite signal containing S1 and S3 and another composite signal containing S2 and S4. The composite signals are then fed into pre-coding block 1304, which may spread the transmission of each composite signal across both antennas 1306a and 1306b as previously described. Accordingly, a pre-coded composite signal $$\frac{(S_1 + S_3 + S_2 + S_4)}{\sqrt{2}}$$

is transmitted via antenna 1306a and another pre-coded composite signal $$\frac{(S_1 + S_3 - S_2 - S_4)}{\sqrt{2}}$$

is transmitted via antenna 1306b.

Figure 14:
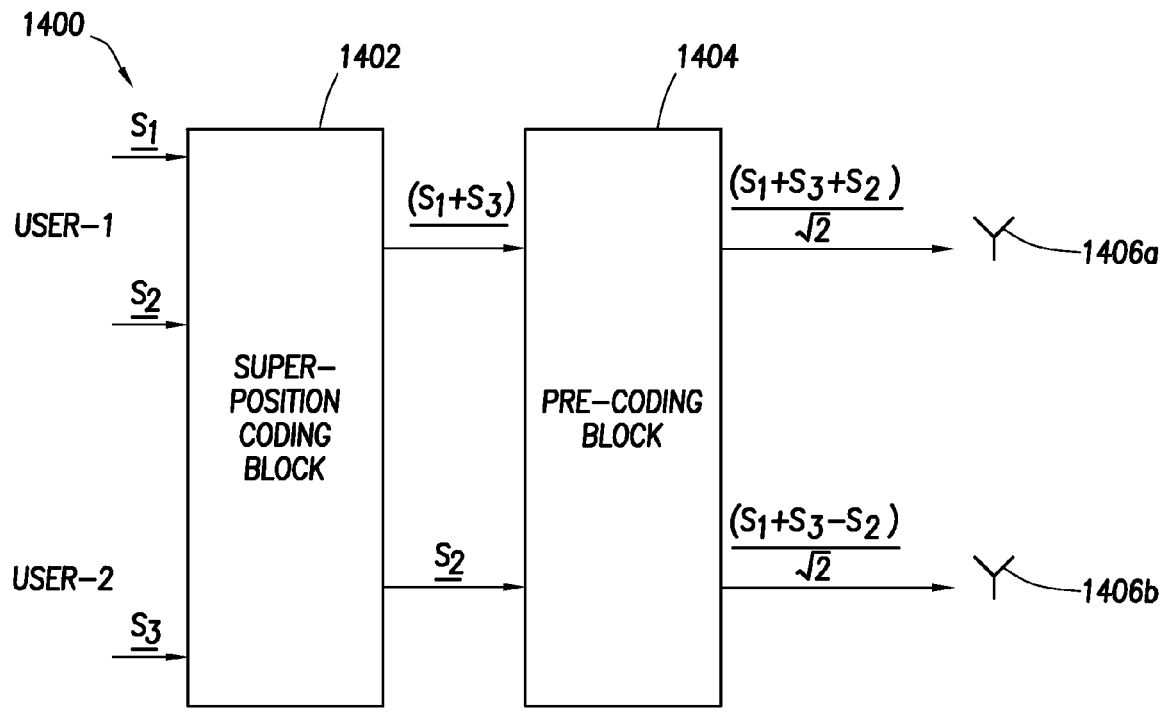
FIG. 14 is a diagram of one embodiment of a MIMO transmitter system using pre-coding after superposition coding with multiple streams for one user and a single stream for another user.

Referring to FIG. 14, one embodiment of superposition coding in a pre-coded MIMO system where signals for users with different code words are superimposed is illustrated using a system 1400 that has a superposition coding block 1402 and a pre-coder block 1404. In this example, using antennas 1406a and 1406b, two code words are transmitted to User-1, while only a single code word is transmitted to User-2.

More specifically, modulation symbols S1, S2, and S3 belong to first, second, and third code words, respectively. The first and second code words are transmitted to User-1, while the third code word is transmitted to User-2. Superposition coding block 1402 creates a composite signal containing S1 and S3. S2 may pass unchanged through superposition coding block 1402 or may bypass the block altogether. The composite signal and S2 are then fed into pre-coding block 1404, which may spread the transmission of both the composite signal and S2 across both antennas 1406a and 1406b as previously described. Accordingly, a pre-coded composite signal $$\frac{(S_1 + S_3 + S_2)}{\sqrt{2}}$$

is transmitted via antenna 1406a and another pre-coded composite signal $$\frac{(S_1 + S_3 - S_2)}{\sqrt{2}}$$

is transmitted via antenna 1406b.

Figure 15:
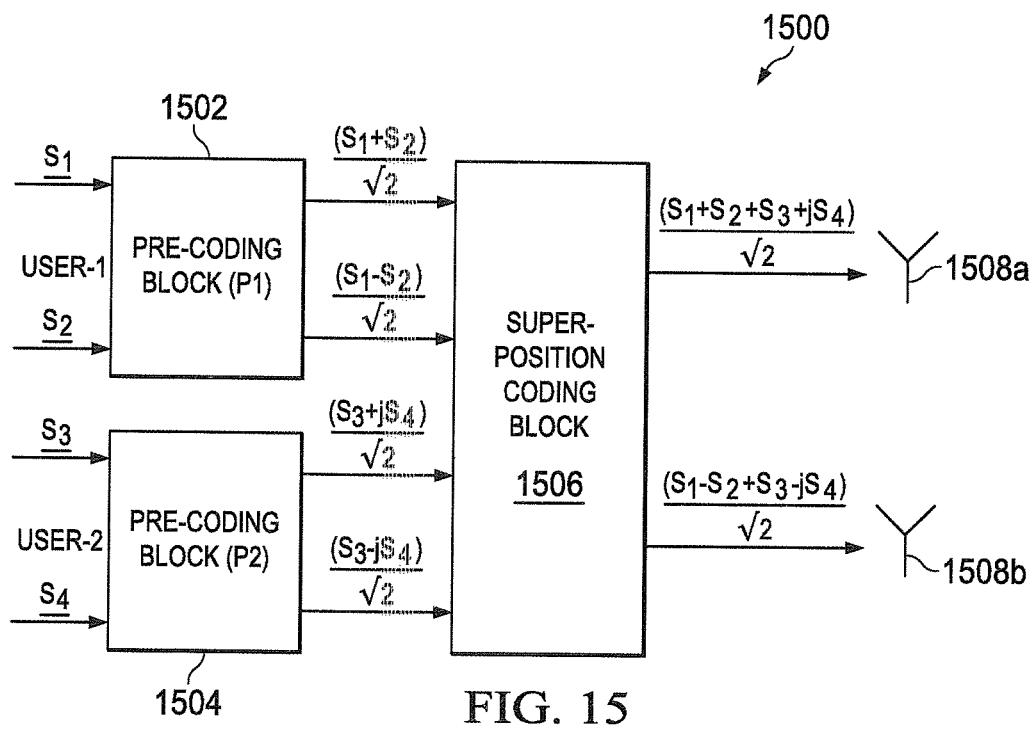
FIG. 15 is a diagram of one embodiment of a MIMO transmitter system using pre-coding before superposition coding with multiple streams per user, where a separate pre-coding block is used for each user.

Referring to FIG. 15, one embodiment of superposition coding in a pre-coded MIMO system where different pre-coders are used for different users is illustrated using a system 1500 that has pre-coder blocks 1502 and 1504 and superposition coding block 1506. In this example, superposition coding is performed after pre-coding. Two code words are transmitted to User-1 using pre-coder block 1502 and two code words are transmitted to User-2 using pre-coder block 1504.

More specifically, User-1 modulation symbols S1 and S2 are pre-coded using pre-coder block 1502 to form $$\frac{(S_1 + S_2)}{\sqrt{2}} \text{ and } \frac{(S_1 - S_2)}{\sqrt{2}},$$

and User-2 modulation symbols S3 and S4 are pre-coded using pre-coder block 1504 to form $$\frac{(S_3 + jS_4)}{\sqrt{2}} \text{ and } \frac{(S_3 - jS_4)}{\sqrt{2}}.$$

The pre-coded information from both pre-coder block 1502 and pre-coder block 1504 is then superimposed by superposition coding block 1506 to form composite signals $$\frac{(S_1 + S_2 + S_3 + jS_4)}{\sqrt{2}} \text{ and } \frac{(S_1 - S_2 + S_3 - jS_4)}{\sqrt{2}}$$

prior to transmission via antennas 1508a and 1508b.

Figure 16:
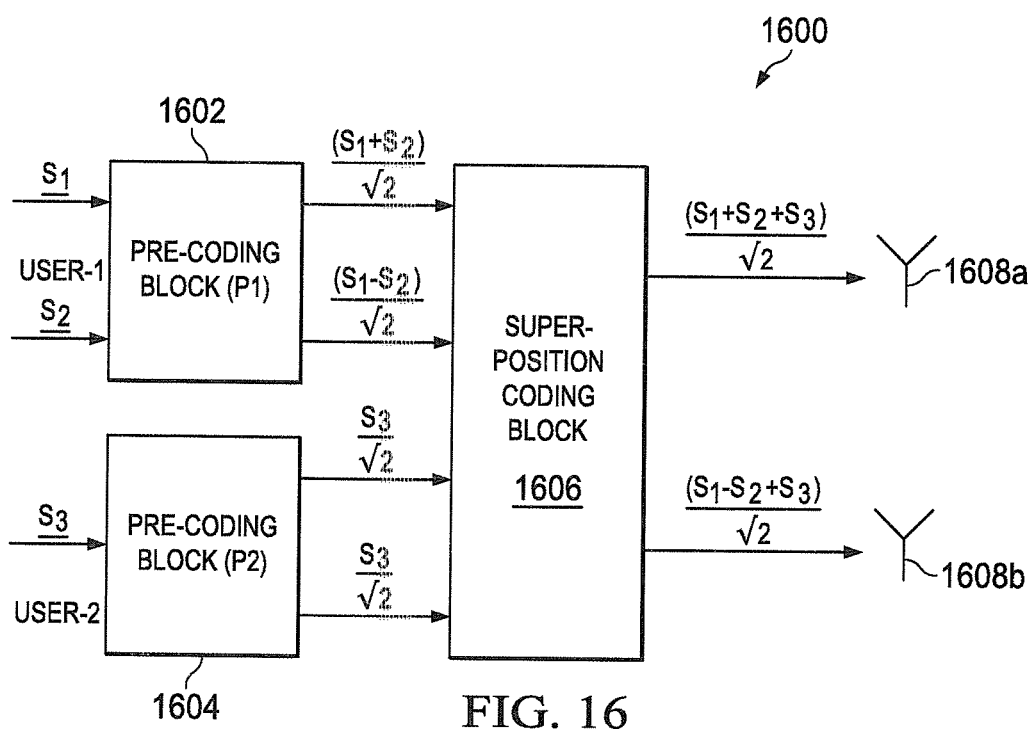
FIG. 16 is a diagram of one embodiment of a MIMO transmitter system using pre-coding before superposition coding with multiple streams for one user and a single stream for another user, where a separate pre-coding block is used for each user.

Referring to FIG. 16, one embodiment of superposition coding in a pre-coded MIMO system where different pre-coders are used for different users is illustrated using a system 1600 that has pre-coder blocks 1602 and 1604 and superposition coding block 1606. In this example, superposition coding is performed after pre-coding, and two code words are transmitted to User-1 using pre-coder block 1602 while only a single-code word is transmitted to User-2 using pre-coder block 1604.

More specifically, User-1 modulation symbols S1 and S2 are pre-coded using pre-coder block 1602 to form $$\frac{(S_1 + S_2)}{\sqrt{2}} \text{ and } \frac{(S_1 - S_2)}{\sqrt{2}},$$

and User-2 modulation symbol S3 is pre-coded using pre-coder block 1604 to form $$\frac{S_3}{\sqrt{2}} \text{ and } \frac{S_3}{\sqrt{2}}.$$

The pre-coded information from both pre-coder block 1602 and pre-coder block 1604 is then superimposed by superposition coding block 1606 to form composite signals $$\frac{(S_1 + S_2 + S_3)}{\sqrt{2}} \text{ and } \frac{(S_1 - S_2 + S_3)}{\sqrt{2}}$$

prior to transmission via antennas 1608a and 1608b.

Figure 17:
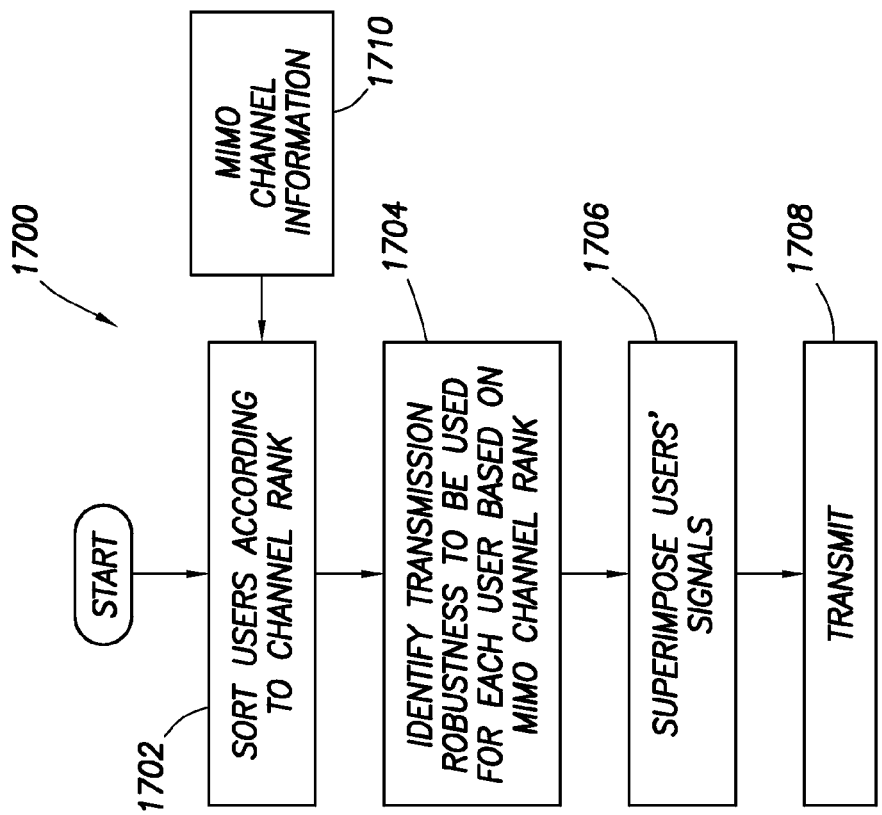
FIG. 17 is a flowchart illustrating one embodiment of a method for sorting users for superpositioning based on MIMO channel rank.

Referring to FIG. 17, in yet another embodiment, a method 1700 illustrates the superposition of user signals based on each user's channel rank (e.g., the rank of the channel matrix H) in a system such as the system 500 of FIG. 5. In step 1702, users are sorted by channel rank based on MIMO information 1710 (e.g., channel rank information).

In step 1704, a level of transmission robustness to be used with each user may be identified based on rank. For example, a higher level of robustness may be identified for lower ranked users, while a lower level of robustness may be identified for higher ranked users.

In step 1706, user signals may be superimposed prior to transmission in step 1708. For example, the signals may be superimposed so that lower rank signals are decoded with higher reliability. This may be achieved by using a higher power gain, beamforming, or a more robust modulation/coding scheme for the lower rank signals. This approach may enable higher rank users to decode lower rank signals and cancel these signals effectively. Furthermore, as lower rank users may not effectively decode the higher rank signals, lower rank signals should be able to be decoded without the need for decoding and canceling the higher rank signals.

Figure 18:
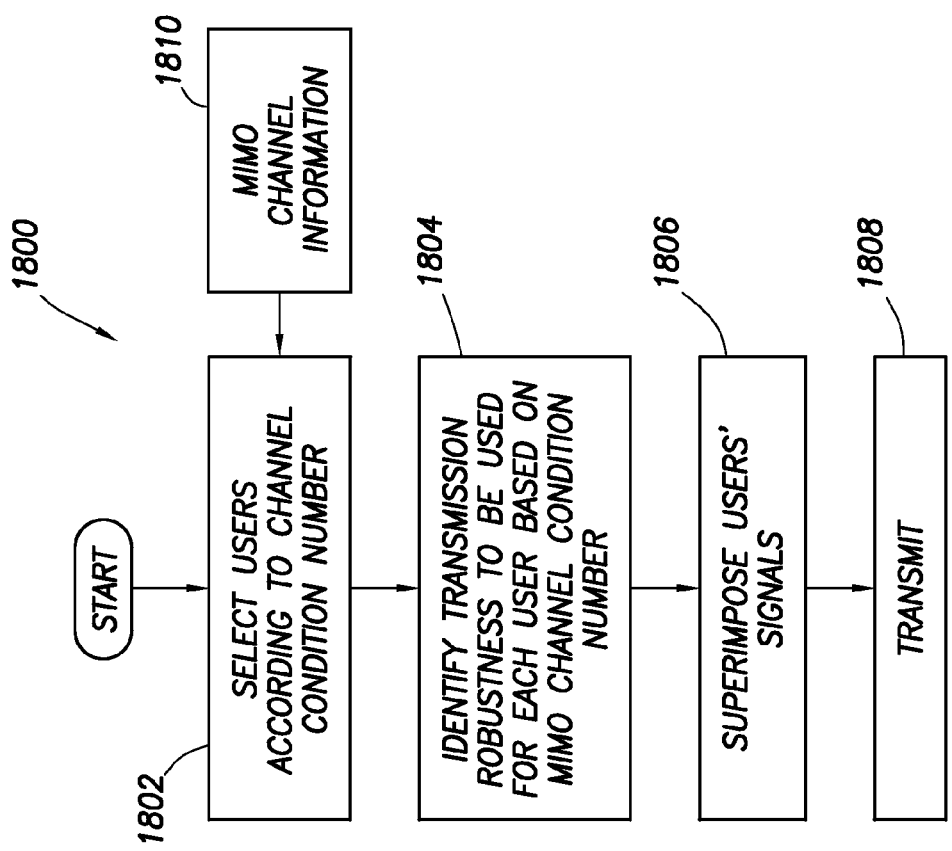
FIG. 18 is a flowchart illustrating one embodiment of a method for sorting users for superpositioning based on MIMO channel condition number.

With additional reference to FIG. 18, the sorting that occurs by channel rank (e.g., in step 1702 of FIG. 17) may result in multiple users having the same channel rank. Accordingly, in addition to or as an alternative to step 1702 of FIG. 17, the condition number of the matrix H (which represents the spread in singular values of the matrix) may be used in sorting the users. In general, a lower spread represents a higher capacity channel.

Accordingly, in step 1802, users are sorted by channel condition number based on MIMO channel information 1810. In step 1804, a level of transmission robustness to be used with each user may be identified based on the channel condition number. For example, a higher level of robustness may be identified for users associated with a higher channel condition number, while a lower level of robustness may be identified for users associated with a lower channel condition number. In step 1806, user signals may be superimposed in such a way that signals corresponding to users having a lower channel condition number are decoded first. Transmission may then occur in step 1808.

Referring to FIGS. 19a and 19b, in still another embodiment, methods 1900 and 1910 illustrate user signal decoding in a situation where superposition coding is based on user MIMO channel rank (i.e., as illustrated with respect to FIG. 17). Method 1900 of FIG. 19a illustrates decoding by a User-1, who has a higher channel rank than User-2 (whose decoding is represented by method 1910 of FIG. 19b). For purposes of illustration, the decoding in the present example corresponds to User-1 and User-2 signal superposition coding as shown in FIG. 16. More specifically, referring also to FIG. 16, User-1 transmits two code words on a rank 2 MIMO channel, while User-2 transmits a single code word on a rank 1 MIMO channel.

As illustrated in FIG. 19a, User-1 with MIMO channel rank 2 first decodes user-2 signal S3 (FIG. 16) in step 1902 and cancels it from the received signal in step 1904. In step 1906, User-1 then decodes its own signals S1 and S2. It is noted that User-1 with a rank 2 MIMO channel is capable of detecting and decoding the rank 1 transmission for User-2. However, User-2 and its corresponding rank 1 MIMO channel may not be able to decode User-1 signals transmitted on the rank 2 MIMO channel. Accordingly, as illustrated in step 1912 of FIG. 19*b*, User-2 may decode its signal S3 without decoding and canceling User-1 signals S1 and S2.

Figure 20:
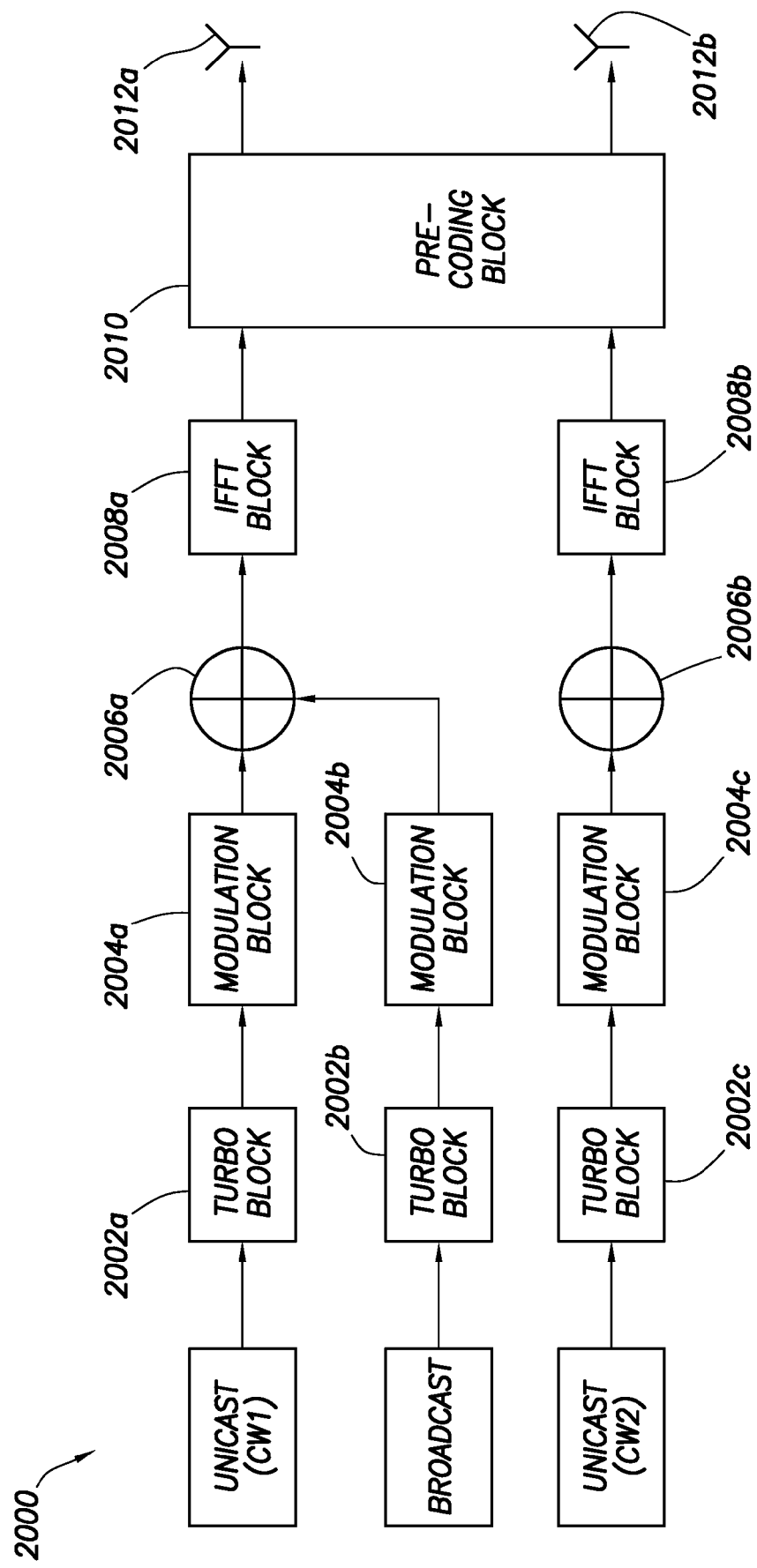
FIG. 20 is a diagram of one embodiment of a MIMO system using superposition coding for a multi-stream unicast signal and a single stream broadcast signal.

Referring to FIG. 20, in another embodiment, a system 2000 illustrates how a broadcast service may be superimposed on a unicast MIMO service. Generally, a broadcast is a point-to-multipoint service that is decodable by a majority of the users in a network. Accordingly, in the present embodiment, the broadcast stream may be detected and cancelled before unicast decoding occurs to improve the overall system efficiency.

In the present example, the system 2000 includes a single-stream transmission for the broadcast traffic and a two-stream MIMO transmission for the unicast traffic. The system 2000 includes Turbo blocks 2002*a*-2002*c* and modulation blocks 2004*a*-2004*c* that handle the first unicast transmission stream (CW1), the broadcast transmission stream, and the second unicast transmission stream (CW2), respectively. All or a portion of the broadcast transmission stream may then be combined with the first unicast transmission stream at block 2006*a* before entering IFFT block 2008*a*. The IFFT blocks 2008*a* and 2008*b* feed into a pre-coding block 2010, which spreads the signals (including the broadcast signal) over antennas 2012*a* and 2012*b* for transmission.

Figure 21:
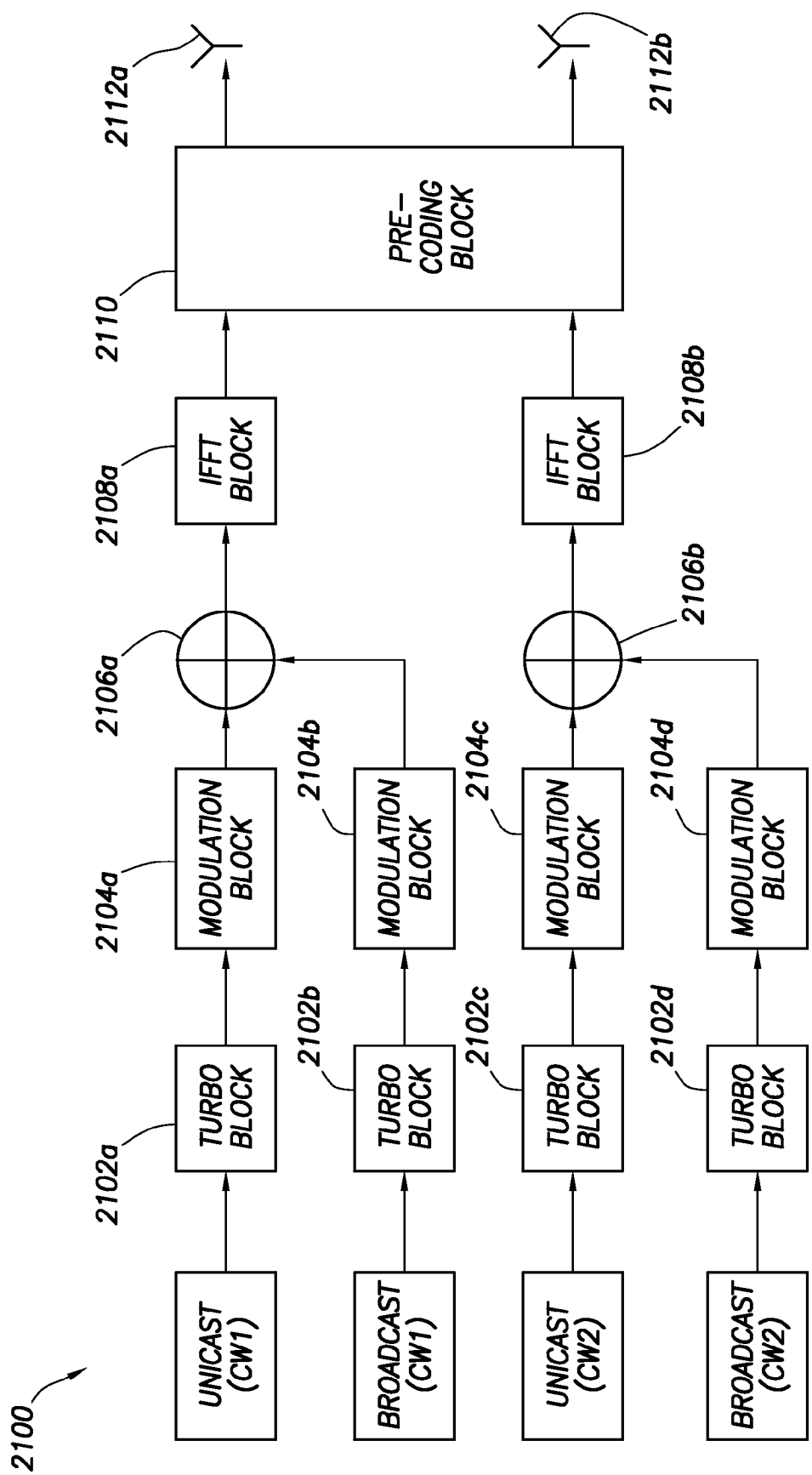
FIG. 21 is a diagram of one embodiment of a MIMO system using superposition coding for a multi-stream unicast signal and a multi-stream broadcast signal.

Referring to FIG. 21, in yet another embodiment, a system 2100 illustrates how a broadcast service may be superimposed on a unicast MIMO service. In the present example, the system 2100 includes two streams for the broadcast traffic and a two stream MIMO transmission for the unicast traffic. The system 2100 includes Turbo blocks 2102*a*-2102*d* and modulation blocks 2104*a*-2104*d* that handle the first unicast transmission stream (CW1), the first broadcast transmission stream (CW1), the second unicast transmission stream (CW2), and the second broadcast transmission stream (CW2), respectively.

In the present example, the first broadcast transmission stream may be combined with the first unicast transmission stream at block 2106*a* after coding and modulation, and the combined signal may be passed through IFFT block 2108*a*. Similarly, the second broadcast transmission stream may be combined with the second unicast transmission stream at block 2006*b* after coding and modulation, and the combined signal may be passed through IFFT block 2108*b*. The IFFT blocks 2108*a* and 2108*b* feed into a pre-coding block 2110, which spreads the signals (including the broadcast signal) over antennas 2112*a* and 2112*b* for transmission.

Referring to FIG. 22, in another embodiment, a decoding process 2200 is illustrated that may be used by a receiver to decode superimposed layers of a two-stream transmission for both unicast and broadcast, such as those encoded by the system 2100 of FIG. 21. It is noted that a total of three interference cancellation operations are performed in this case. In a situation involving a single-stream broadcast transmission and a 2-stream unicast transmission (e.g., FIG. 20), two cancellation operations are performed. In a situation involving a single-stream transmission for both unicast and broadcast, a single interference cancellation operation is performed.

In the present example, beginning with the first broadcast stream, an MMSE operation is performed in block 2202 and the stream is decoded in block 2204. The first broadcast stream is cancelled from the received signal in block 2206, and the resulting signal is fed into block 2208. In block 2208, an MMSE operation is performed and the second broadcast stream is decoded in block 2210. The first and second broadcast streams are cancelled from the received signal in block 2212. If the receiver is a broadcast user, both streams of the broadcast signal have been decoded and processing may stop at this point. Otherwise, the resulting signal from block 2212 is fed into the next block If the receiver is a unicast user, processing continues after canceling the first and second broadcast streams in block 2212. In block 2214, an MMSE operation is performed and the first unicast stream is decoded in block 2216. The first and second broadcast streams and the first unicast stream are cancelled from the received signal in block 2218, and the resulting signal is fed into block 2220. In block 2220, an MRC operation is performed and the second unicast stream is decoded in block 2122.

Accordingly, additional processing may be needed to decode both broadcast and unicast traffic when the signals are superpositioned over a MIMO system as described. However, an amount of buffering needed for cancellation may be substantially the same as is needed in a MIMO interference cancellation receiver, even when multiple interference cancellation operations are performed.

Figure 23:
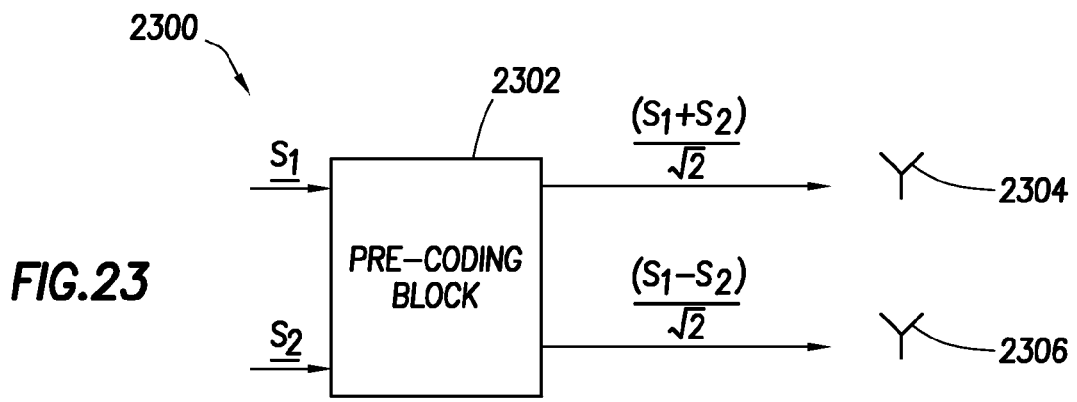
FIG. 23 is a diagram of one embodiment of a system for pre-coding a multi-stream broadcast signal.

Referring to FIG. 23, in yet another embodiment, a system 2300 illustrates how a multi-stream broadcast service may be pre-coded before being transmitted. In the present example, the system 2300 sends two broadcast traffic codewords S1 and S2 through pre-coding block 2302. More specifically, broadcast modulation symbols S1 and S2 are pre-coded using pre-coder block 2302 to form $$\frac{(S_1 + S_2)}{\sqrt{2}} \text{ and } \frac{(S_1 - S_2)}{\sqrt{2}},$$

which are then sent via antennas 2304 and 2306. As previously described, the broadcast traffic may be superimposed with other traffic before or after the pre-coding occurs.

Figure 24:
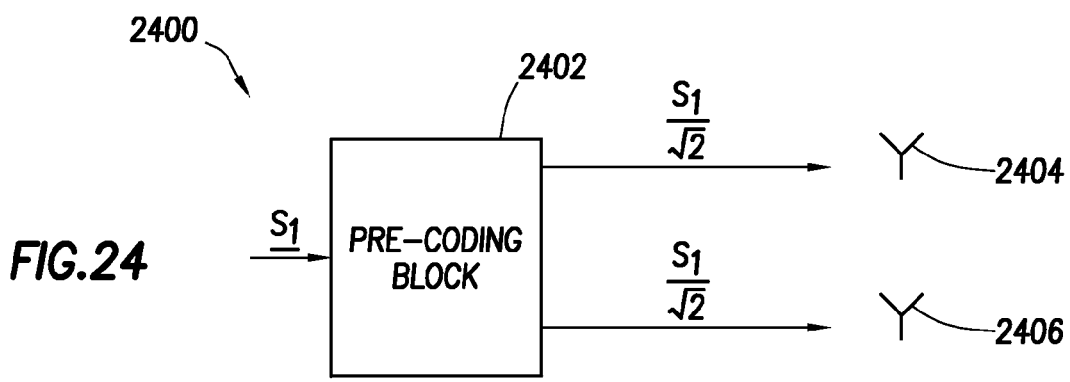
FIG. 24 is a diagram of one embodiment of a system for pre-coding a single stream broadcast signal.

Referring to FIG. 24, in still another embodiment, a system 2400 illustrates how a single-stream broadcast service may be pre-coded before being transmitted. In the present example, the system 2400 sends a single broadcast traffic codeword S1 through pre-coding block 2402. More specifically, broadcast modulation symbol S1 is pre-coded using pre-coder block 2302 to form $$\frac{S_3}{\sqrt{2}} \text{ and } \frac{S_3}{\sqrt{2}},$$

which are then sent via antennas 2404 and 2406. As previously described, the broadcast traffic may be superimposed with other traffic before or after the pre-coding occurs.

Figure 25:
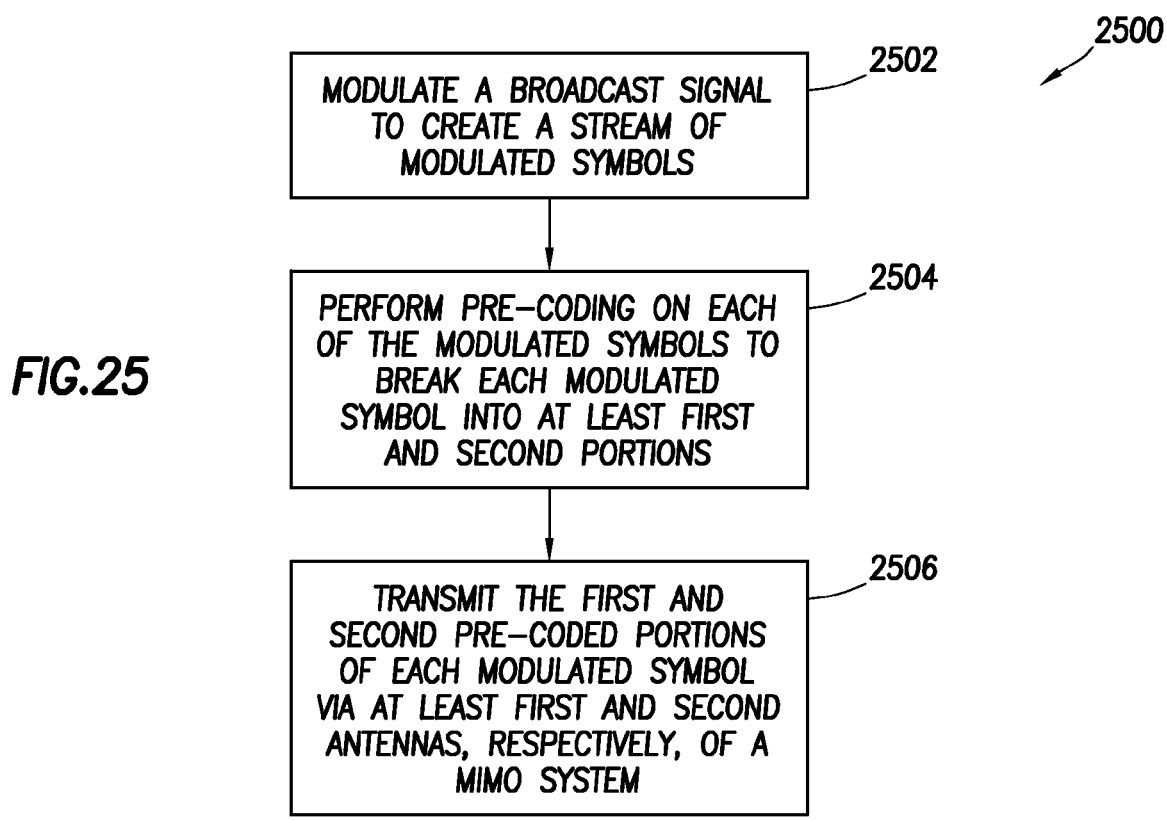
FIG. 25 is a flowchart illustrating one embodiment of a method for pre-coding a broadcast signal for transmission in a MIMO system.

Referring to FIG. 25, in another embodiment, a method 2500 illustrates a process by which pre-coding of a broadcast signal may occur within a MIMO system, such as the system 2400 of FIG. 24. In step 2502, the broadcast signal is modulated to create a stream of modulated symbols. In step 2504, pre-coding is performed on each of the modulated symbols to distribute each modulated symbol across multiple antennas (e.g., the antennas 2404 and 2406 of FIG. 24). In step 2506, the pre-coded symbols may be transmitted.

Although only a few exemplary embodiments of this disclosure have been described in detail above, those skilled in the art will readily appreciate that many modifications are possible in the exemplary embodiments without materially departing from the novel teachings and advantages of this disclosure. For example, various features described herein may be implemented in hardware, software, or a combination thereof. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method, comprising:
   modulating a broadcast data stream to create a stream of modulated symbols;
   superimposing the modulated broadcast data stream on at least one unicast signal;
   performing pre-coding using unitary pre-coding matrices on each of the modulated symbols to break each modulated symbol into at least a first pre-coded portion and second pre-coded portion, the first pre-coded portion being pre-coded using a first of the unitary pre-coding matrices and the second pre-coded portion being pre-coded using a second of the unitary pre-coding matrices; and
   transmitting the first and second pre-coded portions of each modulated symbol via at least first and second antennas, respectively, of a multiple input multiple output (MIMO) system.

2. The method of claim 1, wherein the modulated broadcast data stream is superimposed on the at least one unicast signal prior to performing the pre-coding.

3. The method of claim 1, wherein the modulated broadcast data stream is superimposed on the at least one unicast signal after performing the pre-coding.

4. The method of claim 1, further comprising demultiplexing the broadcast data stream into at least first and second signal portions, wherein the modulating creates a stream of modulated symbols for each of the first and second signal portions, and wherein each stream of modulated symbols is separately pre-coded.

5. The method of claim 4, wherein each of the streams of modulated symbols is superimposed on a portion of the at least one unicast signal prior to performing the pre-coding.

6. The method of claim 4, wherein each of the streams of modulated symbols is superimposed on a portion of the at least one unicast signal after performing the pre-coding.

7. The method of claim 1, further comprising performing an inverse Fast Fourier Transform (IFFT) on the stream of modulated symbols.

8. A method, comprising:
   demultiplexing a broadcast data stream into at least first and second signal portions;
   modulating the first signal portion to create a first stream of modulated symbols;
   modulating the second signal portion to create a second stream of modulated symbols;
   superimposing each of the first and second streams of modulated symbols on a portion of at least one unicast signal;
   performing pre-coding using a first unitary pre-coding matrix on the first stream of modulated symbols to distribute the first stream of modulated symbols between at least first and second antennas of a multiple input multiple output (MIMO) system;
   performing pre-coding using a second unitary pre-coding matrix on the second stream of modulated symbols to distribute the second stream of modulated symbols between at least the first and second antennas; and
   transmitting the pre-coded first and second streams of modulated symbols via at least the first and second antennas,
   wherein the at least one unicast signal comprises a plurality of unicast signals, each unicast signal associated with a different receiver, and the plurality of unicast signals are sorted according to a channel condition number of a matrix before the superimposing, the channel condition number representing a spread in singular values of the matrix.

9. The method of claim 8, further comprising performing an inverse Fast Fourier Transform (IFFT) on the stream of modulated symbols.

10. The method of claim 8, wherein the superimposing occurs prior to performing the pre-coding.

11. The method of claim 8, wherein the superimposing occurs after performing the pre-coding.

12. A method, comprising:
   receiving a broadcast data transmission containing a first pre-coded portion and a second pre-coded portion of a modulated symbol via at least first and second antennas, respectively, of a multiple input multiple output (MIMO) system, the first pre-coded portion being pre-coded using a first unitary pre-coding matrix and the second pre-coded portion being pre-coded using a second unitary pre-coding matrix different from the first unitary pre-coding matrix;
   operating on the first and second pre-coded portions based upon the first and second unitary precoding matrices, respectively, to recover the modulated symbol;
   combining the modulated symbol with other modulated symbols of the broadcast data transmission to recover a modulated broadcast data stream; and
   decoding at least one unicast signal superimposed with the modulated broadcast data stream.

13. The method of claim 12, wherein the broadcast data stream within the broadcast data transmission is cancelled before decoding the unicast transmission.

14. The method of claim 12, wherein the broadcast data stream is superimposed in a higher layer than the unicast transmission.

15. A system, comprising:
   a demultiplexing block configured to demultiplex a broadcast data stream into at least first and second signal portions;
   a modulation block configured to modulate the first signal portion to create a first stream of modulated symbols and the second signal portion to create a second stream of modulated symbols;
   a superposition coding block configured to superimpose each of the first and second streams of modulated symbols on a portion of at least one unicast signal; and
   a pre-coding block configured to pre-code the first stream of modulated symbols using a first unitary pre-coding matrix to distribute the first stream of modulated symbols between at least first and second antennas of a multiple input multiple output (MIMO) system, and to pre-code the second stream of modulated symbols using a second unitary pre-coding matrix to distribute the second stream of modulated symbols between at least the first and second antennas, wherein the at least one unicast signal comprises a plurality of unicast signals, each unicast signal associated with a different receiver, and the plurality of unicast signals are sorted according to a MIMO channel capacity of each receiver before the superimposing, the MIMO channel capacity determined from a received signal-to-noise ratio at each receiver antenna.

16. The system of claim 15, further comprising a transmitter configured to transmit the pre-coded streams of modulated symbols via at least the first and second antennas.

17. The system of claim 15, further comprising a processor configured to perform an inverse Fast Fourier Transform (IFFT) on the stream of modulated symbols.

18. The system of claim 15, wherein the superposition coding block is positioned prior to the pre-coding block.

19. The system of claim 15, wherein the superposition coding block is positioned after the pre-coding block.

20. A system, comprising:
a modulation block configured to modulate a broadcast data stream to create a stream of modulated symbols;
a superposition coding block configured to superimpose each of the modulated symbols on a portion of a unicast signal;
a pre-coding block configured to pre-code each of the modulated symbols using unitary pre-coding matrices to break each modulated symbol into at least a first pre-coded portion and second pre-coded portion, the first pre-coded portion being pre-coded using a first of the unitary pre-coding matrices and the second pre-coded portion being pre-coded using a second of the unitary pre-coding matrices; and
a transmitter configured to transmit the first and second pre-coded portions of each modulated symbol via at least first and second antennas, respectively, of a multiple input multiple output (MIMO) system.

* * * * *